(12) United States Patent
Lindgren et al.

(10) Patent No.: US 11,994,035 B2
(45) Date of Patent: May 28, 2024

(54) VALVE CONTROLLER SYSTEM AND METHOD

(71) Applicant: Pentair Residential Filtration, LLC, Brookfield, WI (US)

(72) Inventors: Andrew Lindgren, Wauwatosa, WI (US); Andrew Mansfield, Brookfield, WI (US)

(73) Assignee: PENTAIR RESIDENTIAL FILTRATION, LLC, Brookfield, WI (US)

( * ) Notice: Subject to any disclaimer, the term of this patent is extended or adjusted under 35 U.S.C. 154(b) by 1013 days.

(21) Appl. No.: 16/460,759

(22) Filed: Jul. 2, 2019

(65) Prior Publication Data

US 2020/0011197 A1    Jan. 9, 2020

Related U.S. Application Data

(60) Provisional application No. 62/693,839, filed on Jul. 3, 2018.

(51) Int. Cl.
| | |
|---|---|
| *F01D 17/18* | (2006.01) |
| *A01G 25/16* | (2006.01) |
| *B01J 49/75* | (2017.01) |
| *B01J 49/85* | (2017.01) |
| *C02F 1/00* | (2023.01) |
| *C02F 1/42* | (2023.01) |

(Continued)

(52) U.S. Cl.
CPC .......... *F01D 17/18* (2013.01); *A01G 25/165* (2013.01); *B01J 49/75* (2017.01); *B01J 49/85* (2017.01); *C02F 1/00* (2013.01); *C02F 1/42* (2013.01); *F16K 11/0716* (2013.01); *F16K 17/02* (2013.01); *C02F 1/008* (2013.01)

(58) Field of Classification Search
None
See application file for complete search history.

(56) References Cited

U.S. PATENT DOCUMENTS

| | | | |
|---|---|---|---|
| 3,477,577 A | 11/1969 | Florkowski | |
| 3,891,552 A | 6/1975 | Prior et al. | |
| 4,352,739 A | 10/1982 | Oliver, Jr. et al. | |

(Continued)

FOREIGN PATENT DOCUMENTS

| | | |
|---|---|---|
| CN | 203309280 U | 11/2013 |
| CN | 302910837 S | 8/2014 |

(Continued)

OTHER PUBLICATIONS

Examination Report issued for UK Patent Application No. 1909601.5 dated Mar. 14, 2022, 3 pages.

(Continued)

*Primary Examiner* — Richard C Gurtowski
(74) *Attorney, Agent, or Firm* — HUSCH BLACKWELL LLP

(57) ABSTRACT

Embodiments of the invention provide a valve controller configured to network with one or more other valve controllers in a water condition system, providing on-board communication between valves. The valve controller can provide, among other features, improved demand recall, user settings protection, dynamic addressing and automatic master unit selection, network settings push capabilities, and/or descriptive error log displays.

20 Claims, 21 Drawing Sheets

(51) Int. Cl.
*F16K 11/07* (2006.01)
*F16K 17/02* (2006.01)

(56) References Cited

U.S. PATENT DOCUMENTS

| | | | |
|---|---|---|---|
| D287,486 S | 12/1986 | Points et al. |
| 4,628,440 A | 12/1986 | Thompson |
| 4,977,394 A | 12/1990 | Manson et al. |
| 4,990,245 A | 2/1991 | Wieme |
| 5,060,167 A | 10/1991 | Ticcioni et al. |
| 5,073,255 A | 12/1991 | Chili et al. |
| D344,901 S | 3/1994 | Conforti |
| 5,300,230 A | 4/1994 | Brane et al. |
| D347,258 S | 5/1994 | Fenske |
| 5,331,619 A | 7/1994 | Barnum et al. |
| 5,351,199 A | 9/1994 | Ticcioni et al. |
| 5,494,573 A | 2/1996 | Schoenmeyr et al. |
| 5,511,397 A | 4/1996 | Makino et al. |
| 5,570,085 A | 10/1996 | Bertsch |
| D380,737 S | 7/1997 | Weir et al. |
| 5,741,416 A | 4/1998 | Tempest, Jr. |
| 5,909,183 A | 6/1999 | Borgstahl et al. |
| 5,938,757 A | 8/1999 | Bertsch |
| 6,036,866 A | 3/2000 | Zimmerman et al. |
| D434,827 S | 12/2000 | Zimmerman et al. |
| 6,275,922 B1 | 8/2001 | Bertsch |
| 6,375,834 B1 | 4/2002 | Guess et al. |
| 6,456,202 B2 | 9/2002 | Johannsen et al. |
| 6,615,088 B1 | 9/2003 | Myer et al. |
| 6,657,546 B2 | 12/2003 | Navarro et al. |
| 6,665,384 B2 | 12/2003 | Daum et al. |
| D485,330 S | 1/2004 | Shyu |
| D485,502 S | 1/2004 | Clivio |
| 6,696,963 B2 | 2/2004 | Zimmerman et al. |
| 6,926,835 B2 | 8/2005 | Iizuka et al. |
| 7,059,003 B2 | 6/2006 | Bergemann et al. |
| 7,200,450 B2 | 4/2007 | Boyer et al. |
| D553,096 S | 10/2007 | Pfingsten et al. |
| D553,097 S | 10/2007 | Lemke et al. |
| D553,100 S | 10/2007 | Peterson |
| 7,319,921 B2 | 1/2008 | Underwood et al. |
| D561,114 S | 2/2008 | Peterson |
| 7,387,722 B1 | 6/2008 | Varner et al. |
| 7,414,516 B2 | 8/2008 | Yoon et al. |
| D604,190 S | 11/2009 | Leer et al. |
| 7,831,321 B2 | 11/2010 | Ebrom et al. |
| 7,844,369 B2 | 11/2010 | Nickerson |
| 7,853,662 B2 | 12/2010 | Ha et al. |
| 7,873,699 B2 | 1/2011 | Ha et al. |
| D636,278 S | 4/2011 | Franchini |
| 7,949,747 B1 | 5/2011 | Van Oosterwijck |
| 8,104,509 B2 | 1/2012 | Leer et al. |
| 8,133,398 B2 | 3/2012 | King et al. |
| 8,180,489 B2 | 5/2012 | Quinn et al. |
| 8,231,791 B2 | 7/2012 | Quinn |
| 8,318,021 B2 | 11/2012 | Armour |
| D674,874 S | 1/2013 | Mueller et al. |
| 8,345,686 B2 | 1/2013 | McCoy et al. |
| D679,260 S | 4/2013 | Franchini |
| D682,715 S | 5/2013 | Wang |
| 8,456,276 B2 | 6/2013 | Dai |
| 8,547,200 B2 | 10/2013 | Han et al. |
| 8,608,963 B2 | 12/2013 | Stewart et al. |
| 8,639,363 B2 | 1/2014 | Gledhill, III et al. |
| 8,758,628 B2 | 6/2014 | Quinn |
| D713,270 S | 9/2014 | Chandran |
| 8,862,802 B2 | 10/2014 | Calvin et al. |
| 8,968,568 B2 | 3/2015 | Armour |
| 9,014,194 B2 | 4/2015 | West et al. |
| 9,043,032 B2 | 5/2015 | Paragot et al. |
| 9,215,586 B2 | 12/2015 | Huang et al. |
| 9,374,424 B2 | 6/2016 | Cheong et al. |
| D771,575 S | 11/2016 | Lohbeck et al. |
| 9,600,434 B1 | 3/2017 | Calvin et al. |
| 9,746,842 B2 | 8/2017 | Reese et al. |
| 9,758,387 B2 | 9/2017 | Gruett et al. |
| 9,800,500 B2 | 10/2017 | West et al. |
| 2001/0039465 A1 | 11/2001 | Schultz et al. |
| 2002/0075160 A1 | 6/2002 | Racz et al. |
| 2003/0168389 A1 | 9/2003 | Astle et al. |
| 2004/0162884 A1 | 8/2004 | Jeon |
| 2006/0168611 A1 | 7/2006 | Fima |
| 2009/0301951 A1 | 12/2009 | Armour |
| 2011/0226684 A1 | 9/2011 | Underwood et al. |
| 2012/0086868 A1 | 4/2012 | Takaya |
| 2012/0199536 A1 | 8/2012 | Dennis et al. |
| 2014/0172178 A1 | 6/2014 | Choi et al. |
| 2014/0263085 A1 | 9/2014 | Mitchell et al. |
| 2014/0336821 A1 | 11/2014 | Blaine et al. |
| 2015/0187209 A1 | 7/2015 | Brandt |
| 2015/0358364 A1 | 12/2015 | Lee |
| 2016/0121269 A1 | 5/2016 | Noh et al. |
| 2016/0182705 A1 | 6/2016 | Lee et al. |
| 2016/0218884 A1 | 7/2016 | Ebrom et al. |
| 2016/0226674 A1 | 8/2016 | Kangshang et al. |
| 2016/0337359 A1 | 11/2016 | Hojsik et al. |
| 2017/0005819 A1 | 1/2017 | Brandt |
| 2017/0048709 A1 | 2/2017 | Patel et al. |
| 2017/0205791 A1 | 7/2017 | Yang et al. |
| 2017/0215261 A1* | 7/2017 | Potucek ............ G05D 7/0635 |

FOREIGN PATENT DOCUMENTS

| | | |
|---|---|---|
| CN | 203864587 U | 10/2014 |
| CN | 303020831 S | 12/2014 |
| CN | 104950699 A | 9/2015 |
| CN | 205109178 U | 3/2016 |
| CN | 303795016 S | 8/2016 |
| CN | 303795087 S | 8/2016 |
| CN | 304105185 S | 4/2017 |
| CN | 304112092 S | 4/2017 |
| CN | 304112093 S | 4/2017 |
| CN | 206156780 U | 5/2017 |
| CN | 206790847 U | 12/2017 |
| CN | 107814419 A | 3/2018 |
| CN | 208210009 U | 12/2018 |
| CN | 208429881 U | 1/2019 |
| CN | 208545133 U | 2/2019 |
| CN | 208561724 U | 3/2019 |
| CN | 208883511 U | 5/2019 |
| CN | 208900822 U | 5/2019 |
| EP | 0078171 B1 | 4/1983 |
| EP | 0188294 A3 | 7/1986 |
| EP | 0423923 B1 | 4/1991 |
| EP | 0447350 B1 | 9/1991 |
| EP | 0555426 B1 | 8/1993 |
| EP | 1147736 B1 | 10/2001 |
| EP | 1174393 B1 | 1/2002 |
| EP | 1390817 A2 | 2/2004 |
| EP | 1443708 A2 | 4/2004 |
| EP | 1443709 A2 | 4/2004 |
| EP | 1447941 A2 | 8/2004 |
| EP | 1863189 B1 | 5/2007 |
| EP | 2048117 B1 | 4/2009 |
| EP | 2045216 A1 | 8/2009 |
| EP | 2345477 B1 | 7/2011 |
| EP | 2487138 B1 | 8/2012 |
| EP | 2728796 A2 | 7/2014 |
| EP | 3242195 A1 | 8/2017 |
| WO | 9015394 A1 | 12/1990 |
| WO | 9300168 A1 | 1/1993 |
| WO | 9634675 A1 | 11/1996 |
| WO | 9816289 A1 | 4/1998 |
| WO | 0075738 A1 | 12/2000 |
| WO | 02097555 A2 | 12/2002 |
| WO | 03029549 A1 | 4/2003 |
| WO | 03088583 A1 | 10/2003 |
| WO | 2005017839 A2 | 2/2005 |
| WO | 2008003572 A2 | 1/2008 |
| WO | 2008107098 A2 | 9/2008 |
| WO | 2009059080 A2 | 5/2009 |
| WO | 2009066179 A1 | 5/2009 |
| WO | 2010043905 A1 | 4/2010 |
| WO | 2011016672 A2 | 2/2011 |

(56) References Cited

FOREIGN PATENT DOCUMENTS

| | | |
|---|---|---|
| WO | 2011041444 A1 | 4/2011 |
| WO | 2011043062 A1 | 4/2011 |
| WO | 2013002610 A2 | 1/2013 |
| WO | 2013166097 A2 | 11/2013 |
| WO | 2014200210 A1 | 12/2014 |
| WO | 2015164237 A1 | 10/2015 |
| WO | 2016107282 A1 | 7/2016 |

OTHER PUBLICATIONS

Search Report, United Kingdom Patent Application No. GB1909601.5, dated Jan. 24, 2020, 4 pages.
Pentair, "Fleck 3900 NXT Installer Manual", gapswater.co.uk [online], Jun. 8, 2018, available from https://www.gapswater.co.uk/acatalog/3900manual2.pdf [accessed Jan. 14, 2020].
Search Report for French Patent Application No. 1907375 dated Jul. 26, 2022, 8 pages.
Examination Report issued for UK Patent Application No. 1909601.5 dated Dec. 20, 2022, 2 pages.
Examination Report issued for UK Patent Application No. 1909601.5 dated Mar. 3, 2023, 1 page.

\* cited by examiner

FIG. 14

| System Type | Time Clock | Day of the Week | Softener/Filter Metered Immediate | Softener/Filter Metered Delayed | Interlock | Series | Alternating | Alternating | Alternating | Demand Recall | Programming Parameter Ranges US | Programming Parameter Ranges Metric |
|---|---|---|---|---|---|---|---|---|---|---|---|---|
| Regen Type | | | | | 5 | 6 | 7 | 8 | 9 | 14 | | |
| Settings Review | x | x | x | x | x | x | x | x | x | x | On, Off | On, Off |
| Language | x | x | x | x | x | x | x | x | x | x | English, Français, Deutsch, Italiano, Español, Nederlands, Português | |
| Assistance Name 1, 2 | x | x | x | x | x | x | x | x | x | x | Custom | Custom |
| Assistance Phone | x | x | x | x | x | x | x | x | x | x | Custom | Custom |
| Regen Type | x | x | x | x | x | x | x | x | x | x | Time Clock, Day of the Week, Softener/Filter Metered Immediate, Softener/Filter Metered Delayed | |
| Valve | x | x | x | x | x | x | x | x | x | x | 2510, 2750, 2815, 2850, 2900, 3150, 3900 | |
| Regen Flow | x | x | x | x | x | x | x | x | x | x | Upflow, Downflow, Filter | |
| Units | x | x | x | x | x | x | x | x | x | x | US, Metric | |
| Remote Regeneration | x | x | x | x | x | x | x | x | x | x | Off, Immediate, Delayed | |
| Auxiliary 1, 2 | x | x | x | x | x | x | x | x | x | x | Off, Alarm Based, Cycle Based, Time Based | |
| Lock Windows 1, 2 | x | x | x | x | x | x | x | x | x | x | On, Off | |
| Meter Type | | | x | x | x | x | x | x | x | x | Paddle (0.75", 1", 1.5", 2", 3") Turbine (0.75", 1.25", 1.5") | Generic |
| Continuous Flow Detect | | | | | | | | | | x | On, Off | |
| Same as Non Factors | | | x | x | x | x | x | x | x | x | | |
| Lock Settings | x | x | x | x | x | x | x | x | x | x | Off, Delayed, Enter Code, Time Based | |
| Day Override Time | | | | x | | | | | | x | Off-99 Days | |
| Driver | | | | | | | | | | | | |
| Regen Time | x | x | | | | | | | | | Any | |
| Day of the Week | | x | | | | | | | | | Su, MO, Tu, WE, TH, FR, SA | |
| Capacity | | | x | x | x | x | x | x | x | x | 0-9,999,999 Grains | 0-9,999,999 Grams, 0-360,187 |
| Hardness | | | x | x | x | x | x | x | x | x | 0-199 GPG | 1x°DH |
| International Hardness | | | | | | | | | | | | 0-19,999 mg/L, 0-1402 °FH, 0-199.9 °CH, 0-112 °DH |
| Units | | | | | | | | | | | mg/L, °FH, °CH, °DH | |
| Reserve | | | x | x | x | x | x | x | x | x | Weekly Reserve, Variable Reserve, Fixed % Fixed Volume | |
| Number of Tanks (Max) | 1 | 1 | 1 | 1 | 8 | 6 | 2 | 2 | 8 | 8 | 2, 3, 4, 5, 6, 7, 8 | |
| Push Settings | | | | | | | | | | x | On, Off | |
| Trip Point #1,2 GPM | | | | | | | | | | x | 0-1,999 GPM | 0-7,569 LPM |
| Trip Point #1,2 SD | | | | | | | | | | x | 1-30s | |
| Trip Point #1-7 STBD | | | | | | | | | | x | 60-300s | |

| Screen | Example |
|---|---|
| FLOW RATE 29.7 GPM | Example: Real-time flow rate reading. |
| PEAK FLOW 30.1 GPM | Example: Peak flow since last regeneration. |
| TOTALIZER 482474 G | Example: Gallons at the outlet since installation. |
| RESERVE 1588 G | Example: Reserve Capacity setting. |
| USE SINCE REGEN 7331 G | Example: Gallons at the outlet since last regeneration. |
| LAST REGEN. 4 H | Example: Time since last regeneration. |
| SOFTWARE VERSION 13026 | Example: Installed software version. |
| NO. OF REGENS 32 | Example: Total number of regenerations since installation. |
| REGEN INTERVAL 3 D 21 H | Example: Duration between regenerations. |
| LAST SETTINGS CHANGE 14 H 0 M | Example: Last time programming settings were changed. |

| Message Displayed | Cause For Error | Correction |
|---|---|---|
| Error<br>Valve Count Mismatch | Number of NXT2 detected does not match selected system type in Master Programming | Push correct valve settings in Master Settings |
| Motor Stall<br>No Changes Detected in the Optical Sensor for 6 Seconds | The motor is on but no encoder pulses are detected within a given duration while homing. | Check the P11 connection and trigger a manual regeneration. |
| Motor Run-On<br>No CAM Switch Change Detected | The motor is on but no encoder pulses are detected or CAM Switches change state within a given duration. | Verify correct valve type is chosen. Trigger a manual regeneration. |
| Optical Sensor<br>Undesired change detected by the Optical Sensor | The motor is off but additional encoder pulses are detected. | Trigger a manual regeneration. |
| Over-Current<br>Motor Over-Current is Detected | Motor current exceeds thresholds. | Trigger a manual regeneration. |
| Flow Meter Error<br>Continuous Flow Detected | Flow exceeded specified threshold for a specific duration. | Trigger a manual regeneration. |
| Error<br>Send/Receive Failure | During a setting push, a packet was missing. | Reconnect communication cables and push setting in Master Settings. |
| Errror<br>System Type Mismatch on Network | The system type among connected units does not match. | Push correct system settings in Master Settings. |
| Memory Corruption | Calibration or manufacturing test was not performed | Re-upload and run the manufacturing test, upon passing, upload .hex and .mot files |
| 100 Days Without Regen | 100 Days have expired without a regeneration | Trigger a manual regeneration |

FIG. 19

VALVE CONTROLLER SYSTEM AND METHOD

CROSS-REFERENCE TO RELATED APPLICATIONS

This application claims priority to co-pending U.S. Provisional Patent Application No. 62/693,839, filed Jul. 3, 2018, which is entirely incorporated herein by reference.

BACKGROUND

In water softener systems, multiple tanks can provide an efficient and reliable means for providing continuous soft water. Each tank can include a valve arrangement that controls fluid movement to and from the tank during water treatment and tank regeneration. For example, each valve arrangement includes a valve and a controller, such as a mechanical or digital timer, that controls the valve. The controller can control the valve based on regeneration parameters (e.g., regeneration start, regeneration cycle time, etc.) and/or other parameters.

SUMMARY

Some embodiments of the invention include a valve controller configured to control a valve in a water conditioning system. The valve controller includes a controller housing, a user interface on the controller housing, the user interface including a display and one or more buttons configured to receive user inputs, and a control board supported by the controller housing, the control board including a microcontroller in communication with the display, the one or more buttons, and a motor configured to the control the valve. The microcontroller is configured to communicate with one or more other valve controllers in the water conditioning system, store a plurality of system parameters in memory, control the motor to operate the valve based on one or more of the system parameters, update one or more of the system parameters based on the user inputs received through the user interface, and push the updated system parameters to the one or more other valve controllers in the water conditioning system.

In some embodiments, the microcontroller is further configured to display an error log to a user via the display, and each error in the error log includes an error description and a timestamp. In some embodiments, the microcontroller is further configured to restrict access to the plurality of system parameters unless a specified user input is received, the specified user input including one of a pre-set button hold delay, a pre-set passcode, or a pre-set clock time. In some embodiments, the microcontroller is further configured to automatically assign the valve controller an address within a network formed by the valve controller and the one or more other valve controllers. In some embodiments, automatically assigning the valve controller the address within the network further includes, via the microcontroller:
a) selecting a number, based on an internal hardware timer;
b) communicating the number to the one or more other valve controllers in the water conditioning system; c) determining if the number corresponds to one of the one or more other valve controllers in the water conditioning system; d) selecting a different number upon determining that the number corresponds to one of the one or more other valve controller in the water condition system; repeating steps a) through d) until a selected number does not corresponds to one of the one or more valve controllers; and assigning the selected number as the address of the valve controller within the network.

In some embodiments, the microcontroller is further configured to store a non-factory reset version of the plurality of system parameters in the memory, and updating the one or more system parameters includes resetting the system parameters to the non-factory reset version. In some embodiments, the microcontroller is configured to push the updated system parameters to the one or more other valve controllers in the water conditioning system in response to a push menu option, selected via the user interface. In some embodiments, the valve controller further comprises a plurality of operating modes, where a first operating mode is a programming mode that enables user changes to the plurality of system parameters. In some embodiments, the microcontroller is configured to: detect a regeneration of the valve controller; determine the valve controller is operating in the programming mode; and exit the programing mode during a duration of the regeneration. In some embodiments, the user interface is configured to display a regeneration step and corresponding time remaining until regeneration is complete. In some embodiments, the microcontroller is configured to prevent the valve controller from entering the program mode during regeneration.

Some embodiments of the invention include a water conditioning system network including a first valve controller configured to control a first valve of a first tank to operate the first tank in one of an in service, a standby, and a regeneration mode; a flow meter configured to communicate a flow rate to the first valve controller; and a second valve controller configured to control a second valve of a second tank to operate the second tank in one of an in service, a standby, and a regeneration mode, the second valve controller in communication with the first valve controller and configured to operate the second tank in the in service mode if the flow rate is above a threshold, the second valve further configured to operate the second tank in the in service mode if the first tank is depleted, independent of the flow rate.

In some embodiments, the first valve controller is configured to operate as a master controller within the water conditioning system network, and the second valve controller is configured to operate as a slave controller within the water conditioning system network. In some embodiments, the first valve controller includes a user interface including a display and one or more buttons configured to receive user inputs, and wherein the first valve controller is configured to push system parameters corresponding to user inputs to the second valve controller. In some embodiments, the first valve controller is configured to coordinate with the second valve controller to control operation timing, via the water conditioning system network. In some embodiments, the first valve controller further includes a connector configured to receive a data connection cable corresponding to an external computer, and wherein the first valve controller is configured to receive updated system parameters via the external computer and push the updated system parameters to the second valve controller.

In some embodiments, the water conditioning system network includes a wireless communication network configured to transfer communications between the first valve controller and the second valve controller. In some embodiments, the first valve controller is configured to: detect a regeneration of the second valve controller; determine the second valve controller is operating in the standby mode; and initiate exit of the second valve controller from the standby mode for a duration of the regeneration. In some embodiments, the first valve controller includes a user interface configured to display a regeneration step and corresponding time remaining until regeneration is complete. In some embodiments, the first valve controller includes a user interface configured to display a non-volatile error log including descriptions and timestamps, the non-volatile error log corresponding to a plurality of devices within the water conditioning system network.

DESCRIPTION OF THE DRAWINGS

FIG. 14 is a diagram of control parameters of the valve controller of FIG. 2, according to some embodiments.

FIG. 18A is a flow diagram of a diagnostic programming mode of the valve controller of FIG. 2, according to some embodiments.

FIG. 19 is a diagram of example displayed error conditions of the valve controller of FIG. 2, according to some embodiments.

DETAILED DESCRIPTION

Figure 1A:
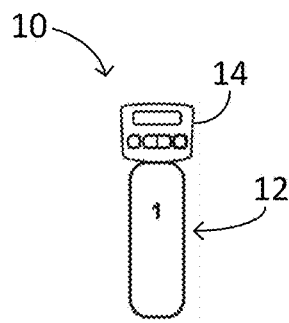
FIG. 1A is a schematic view of a single-unit water conditioning system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention provide a valve controller for use with one or more valves in a water conditioning system. More specifically, some embodiments provide a valve controller configured to network with other valves in the system, providing on-board communication between valves and enabling continuous water conditioning. The valve controller can provide, among other features, improved demand recall, user settings protection, dynamic addressing and automatic master unit selection, network settings push capabilities, and/or descriptive error log displays.

In some embodiments, the valve controller may be used in a water conditioning system such as, but not limited to, a water softening system (such as a point-of-entry (POE) or point-of-use (POU) water softening system), a water purification system, a water filtration system, a reverse osmosis system, or another type of water conditioning system. Furthermore, the water conditioning system may be used in residential, industrial, or commercial applications. By way of example, the water conditioning system will be described herein as a POE water softening system.

Figure 1B:
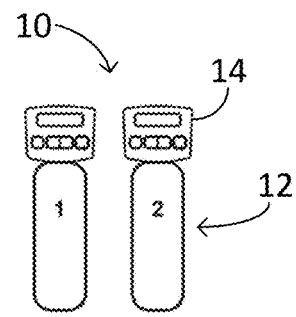
FIG. 1B is a schematic view of a multi-unit water conditioning system including two units.
Figure 1C:
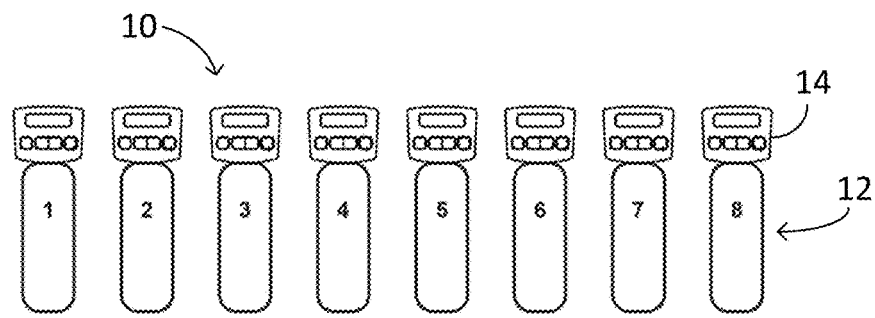
FIG. 1C is a schematic view of a multi-unit water conditioning system including eight units.
Figure 1D:
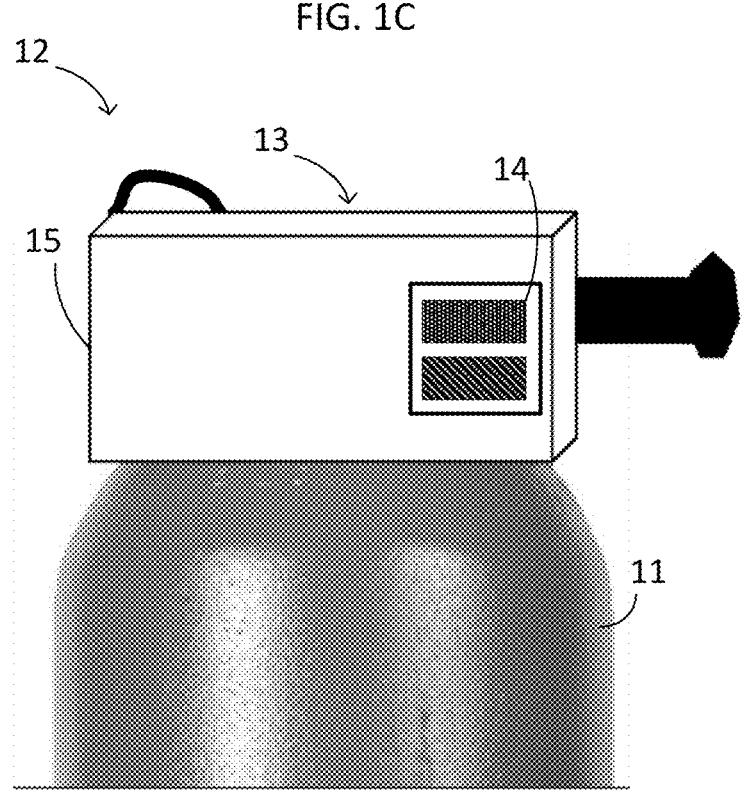
FIG. 1D is a partial front elevational view of a water conditioning system.

Generally, a water conditioning system can include one or more treatment units, with each unit including a tank and an associated valve arrangement. Each valve arrangement can include a valve housing, a valve in fluid communication with the tank, and a valve controller configured to control operation of the valve. For example, FIG. 1D illustrates a unit 12 including a tank 11 and a valve arrangement 13 with a valve controller 14, a valve housing 15, and a valve (not shown). The valve controller 14 can operate or control the valve to open or close one or more fluid (e.g., water) pathways, such as a water inlet pathway, a water outlet pathway, a regenerate pathway, and/or a drain line. The valve controller 14 can control valve operation according to a preprogrammed timer or schedule, as further described below. As such, in some aspects, the valve controller 14 may be considered a valve timer or timer assembly.

Generally, the valve controller 14 can be housed within or supported by the valve housing 15. In some embodiments, the valve controller 14 can be removably coupled to the valve (and the housing 15) so that different valve controllers 14 can be installed or replaced in a particular valve assembly 13. Valve controllers 14 in a multi-unit system can be connected in a wired or wireless manner to enable communication between valve controllers 14 and networked operation among units 12 in the system. For example, a water conditioning system 10 can include a single unit 12, as shown in FIG. 1A (shown schematically with a valve controller 14), two units 12 in fluid communication, as shown in FIG. 1B, eight units 12 in fluid communication, as shown in FIG. 1C, or any other number of units 12 (such as three to seven units, or greater than eight units). Additionally, while the units 12 may be shown and described herein as including the same type of controller 14, in some embodiments, a system 10 can include tanks having one or more different types of controllers 14.

Figure 2:
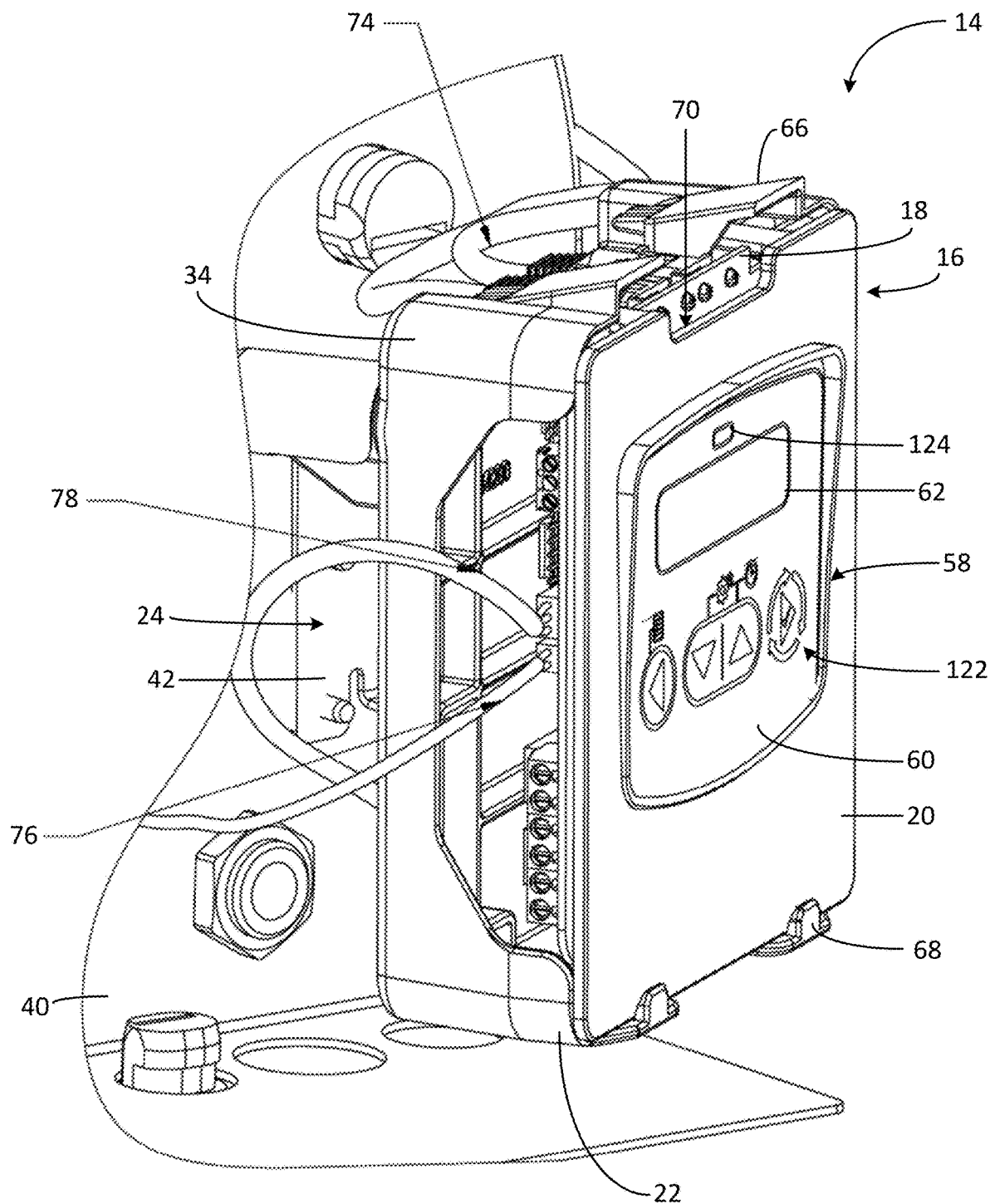
FIG. 2 is an isometric view of a valve controller according to some embodiments.
Figure 3:
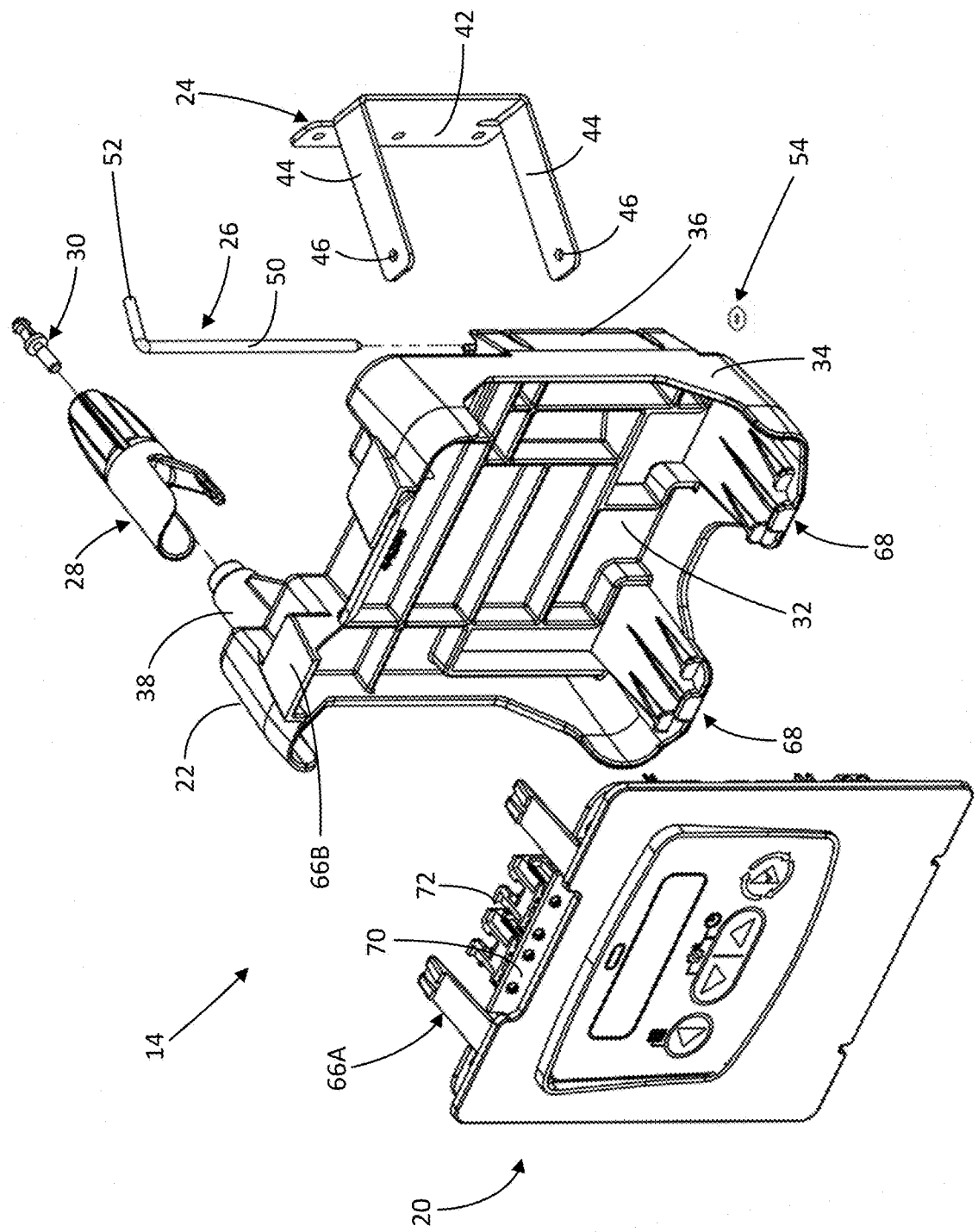
FIG. 3 is an exploded isometric view of a controller housing of the valve controller of FIG. 2.

FIGS. 2 and 3 illustrate a controller 14 according to some embodiments. Generally, the controller 14 can include a controller housing 16 and a control board 18 supported by the controller housing 16. Further, in some embodiments, the controller 14 can include a bracket 24, a pin 26, a standoff 28, and a fastener 30 configured to couple the controller housing 16 to a valve assembly, as further described below.

Figure 4:
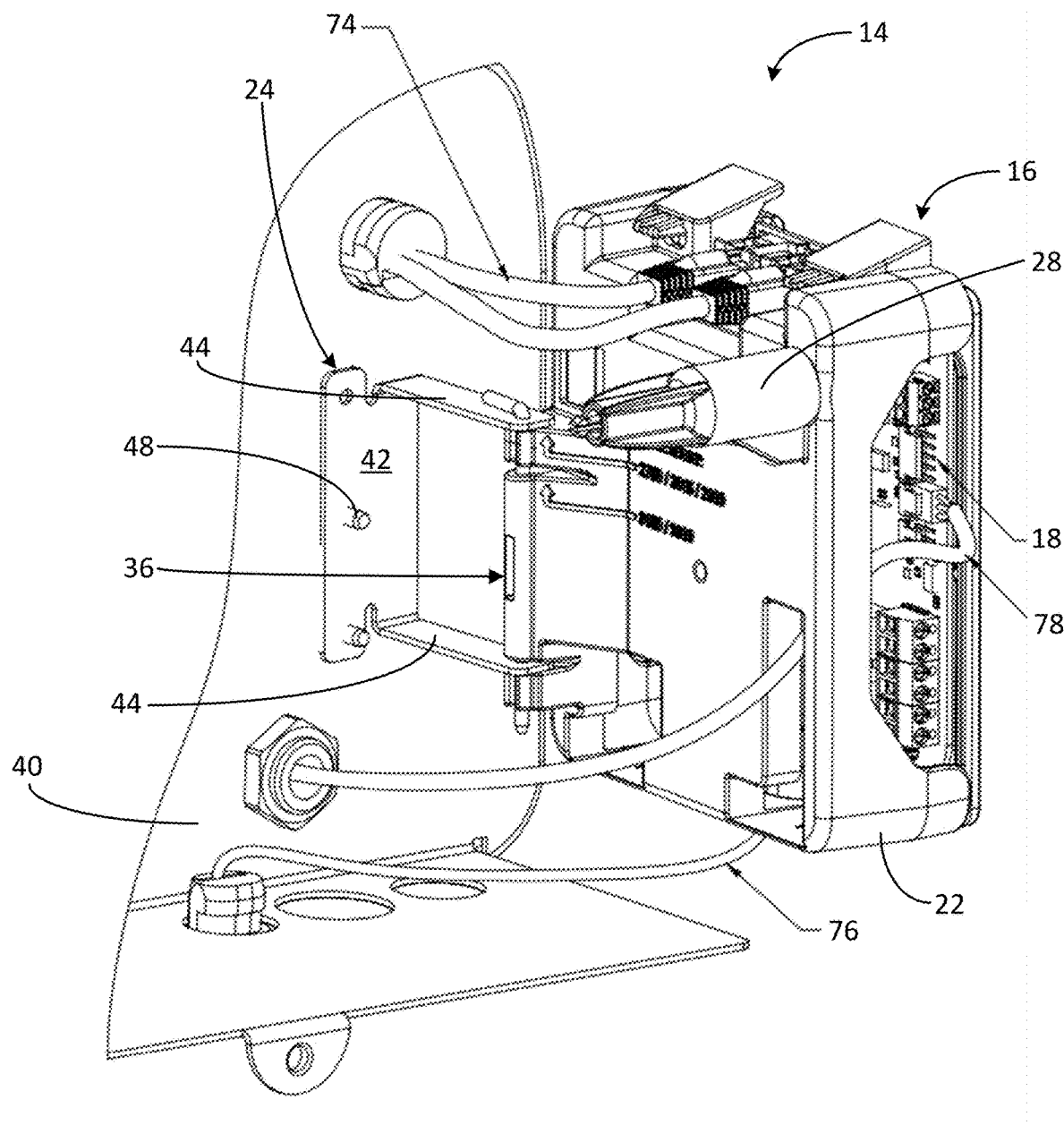
FIG. 4 is another isometric view of the valve controller of FIGS. 2 and 3 coupled to a baseplate of a valve assembly.

In one embodiment, as shown in FIGS. 2-4, the controller housing 16 can include a front housing 20 and a rear housing 22. The front housing 20 and the rear housing 22 can be removeably coupled to one another and can be sized to house or support the control board 18 (e.g., a printed circuit board) when coupled together. For example, the rear housing 22 can be substantially square or rectangular in shape with a rear face 32 and side faces 34 extending forward from the rear face 32. One or more of the side faces 34 (and/or the rear face 32) can include fastening elements configured to couple the front housing 20 to the rear housing 22, as further described below. Additionally, the rear housing 22 can include a hinge 36 and an extension 38 extending rearward from the rear face 32.

Generally, the rear housing 22 can be permanently or releasably coupled to a valve housing of a valve assembly via one or more connections. For example, as shown in FIG. 4, the bracket 24 can couple the rear housing 22 to the valve housing via a hinged connection via the hinge 36. More specifically, in some embodiments, the bracket 24 can include a base 42 and one or more fingers 44 with aligned apertures 46. As shown in FIGS. 2 and 4, the base 42 can be coupled to a baseplate 40 of the valve housing (e.g., via fasteners 48, such as screws) so that the fingers 44 extend outward from the baseplate 40. The hinge 36 of the rear housing 22 can align with the apertures 46 of the fingers 44, and the pin 26 can be routed through the apertures 46 and the hinge 36 to couple the components together, allowing the rear housing 22 to pivot relative to the bracket 24 (that is, about the pin 26). As shown in FIG. 2, in some embodiments, the pin 26 can be L-shaped with a vertical member 50 that can be routed through the apertures 46 and the hinge 36, and a horizontal member 52 that can rest against a top finger 44 to maintain the vertical member 50 in the apertures 46 and the hinge 36. In some embodiments, once the pin 26 is positioned through the apertures 46 and hinge 36, an o-ring 54 can be positioned along a lower portion of the vertical member 50 to inhibit upward movement of the pin 26 during rotation of the rear housing 22.

In addition to the hinged connection, the rear housing 22 can be coupled to the valve housing 15 via the standoff 28, the extension 38, and the fastener 30. For example, the standoff 28 can be coupled to the baseplate 40 of the valve housing 15 via the fastener 30 (e.g., through a fastener aperture on the baseplate 40). As shown in FIG. 2, the extension 38 of the rear housing 22 can be received by the standoff 28. For example, the rear housing 22 can be pivoted or rotated at the hinge 36 until the extension 38 is received within the standoff 28. In some embodiments, the components may "lock" together to maintain the rear housing 22 in place, for example, as a one-time snap-on connection. The standoff 28 and taller bracket 24 (e.g., compared to a shorter bracket 24A of FIG. 3, as described below) can act as a spacing mechanism to properly position the front control housing 20 in the valve housing 15 (e.g., for improved user access).

Figure 5:
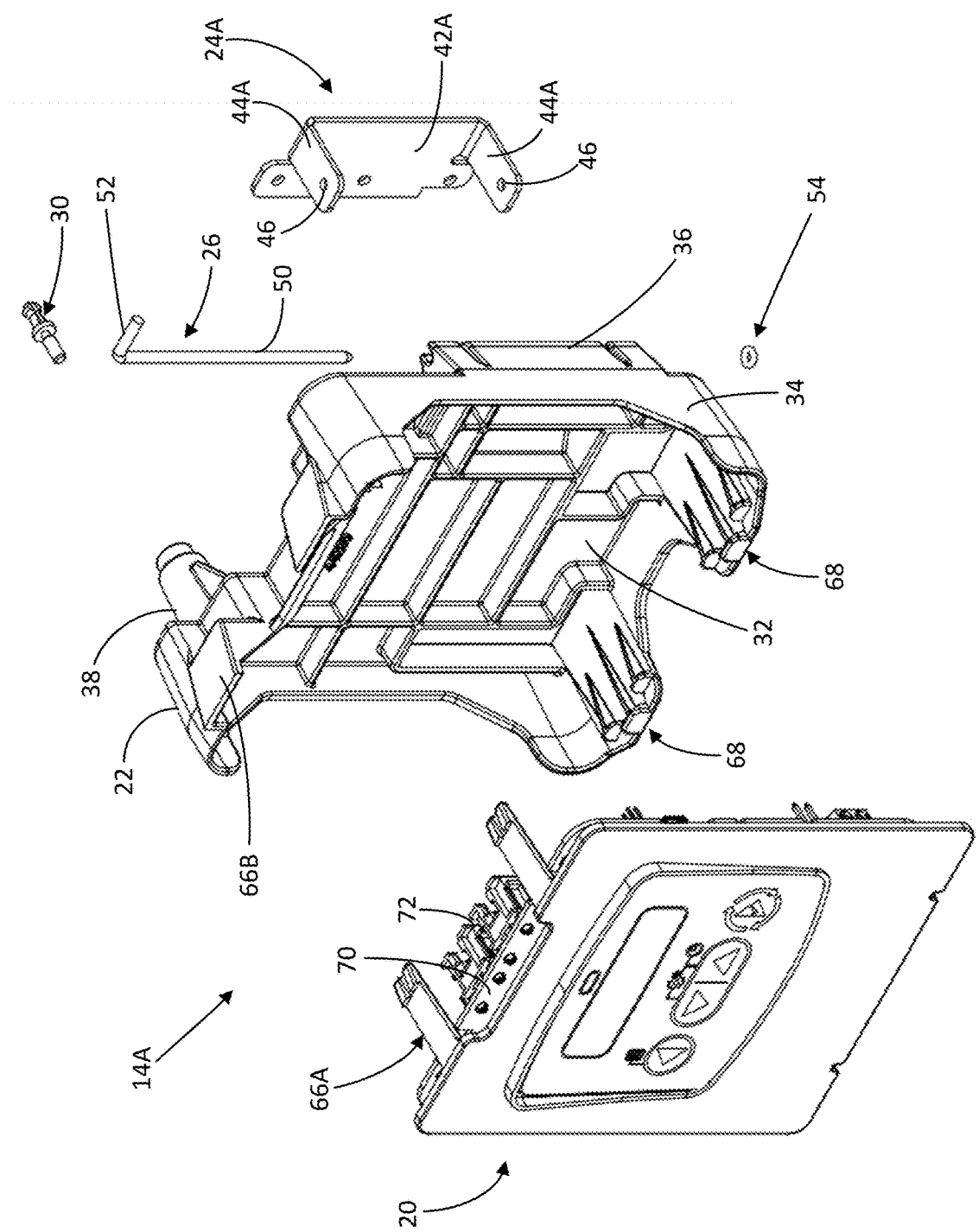
FIG. 5 is an exploded isometric view of a controller housing of a valve controller according to some embodiments.
Figure 6:
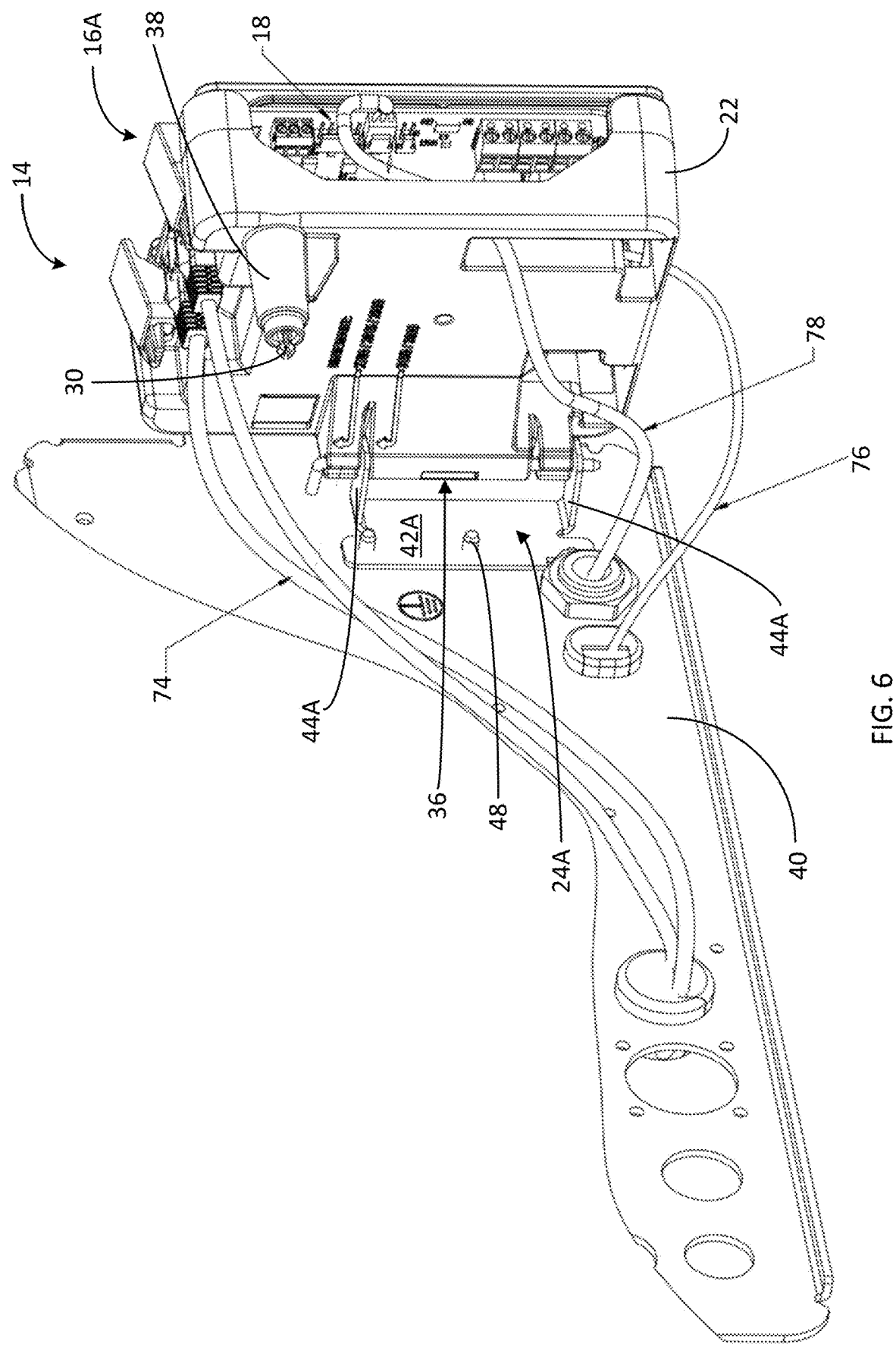
FIG. 6 is an isometric view of the valve controller of FIG. 5 coupled to a baseplate of a valve assembly.

In some embodiments, the controller 14 can include different components to accommodate different types of valve housings (e.g., having different baseplates). For example, FIGS. 5-6 illustrate a controller 14A according to another embodiment. The controller 14A can be similar to the controller 14 of FIGS. 2-4 (e.g., including one or more of the same controller housing 16, pin 26, and fastener 30), but includes a different bracket 24A and no standoff. For example, the bracket 24A can include shorter fingers 44A than the fingers 44 of bracket 24. Additionally, as shown in FIGS. 5-6, the extension 38 of the controller housing 16 can be directly coupled to and in communication with the baseplate 40 via the fastener 30 (that is, rather than indirectly coupled via the standoff, as with the controller housing 16 of FIGS. 2-4).

Figure 7:
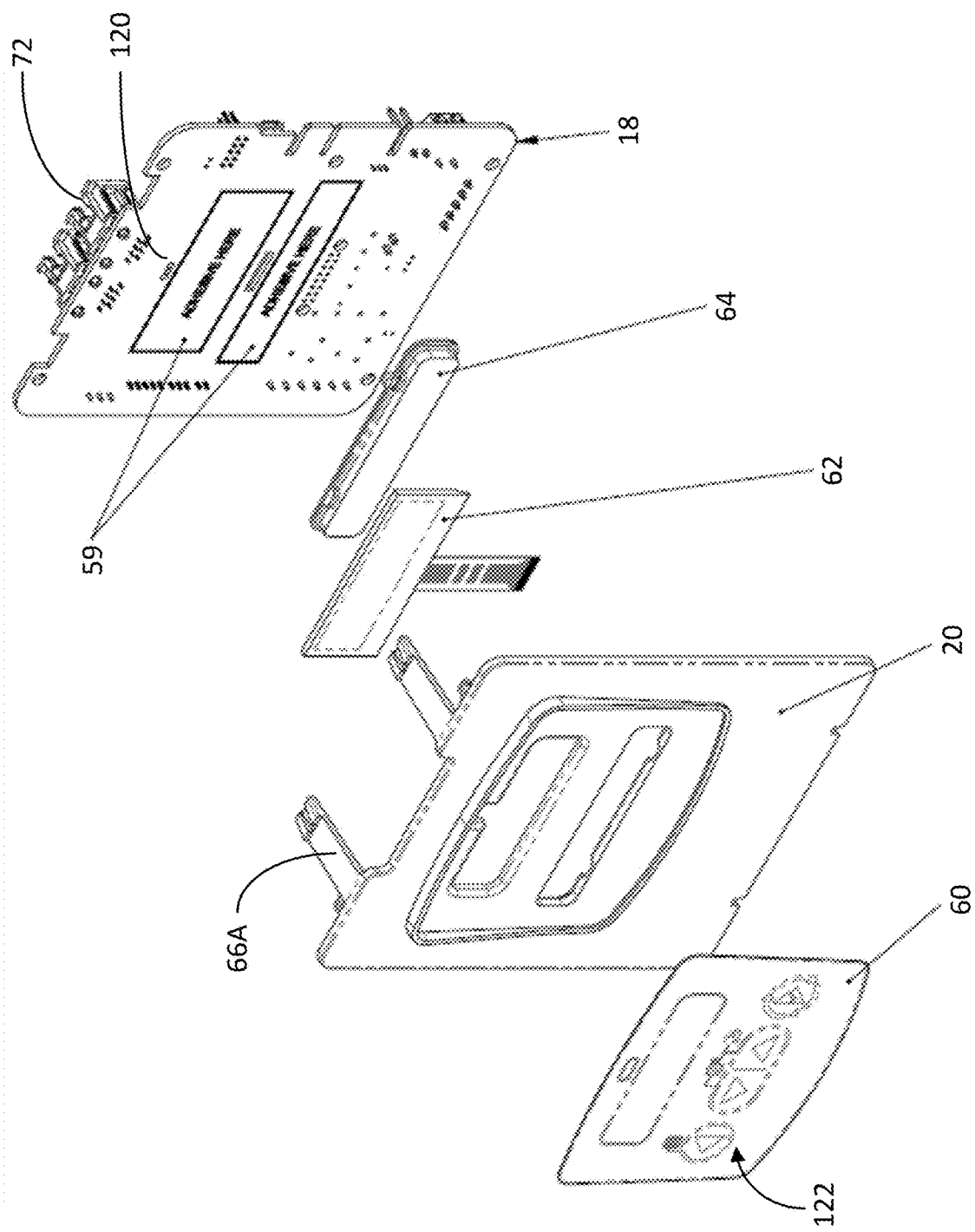
FIG. 7 is an exploded isometric view of a front housing and a control board of the valve controller of FIG. 2.

As shown in FIGS. 2-6, the rear housing 22 can be coupled to the front housing 20 to at least partially enclose an interior of the controller housing 16. In some embodiments, the front housing 20 can be substantially planar, including a substantially flat front face. As such, the front housing 20 may be considered a face plate in some embodiments. However, in other embodiments, the front housing 20 can include one or more side faces and/or may have a curved front face. The front housing 20 can also include a user interface 58, as further described below. For example, as shown in FIG. 7, the user interface 58 can include an overlay 60 on a forward face of the front housing 20, and a display 62 and a touch pad assembly 64 behind the front housing 20 and coupled to the control board 18. More specifically, the touch pad assembly 64 can include a spacer coupled to the control board 18 to align with a touch pad on the control board 18. The front housing 20 can include apertures so that the display 62 and the touch pad assembly 64 are accessible through the overlay 60. Additionally, the control board 18 can be coupled to the front housing 20 (e.g., with snap fittings or other fasteners, not shown) so that the components of the user interface 58 properly align with the control board 18.

In some embodiments, one or more sides of the front housing 20 can include fastening elements configured to couple the front housing 20 to the rear housing 22. For example, in some embodiments, as shown in FIGS. 3 and 5, an upper side of the front housing 20 can include one or more male clip members 66A that extend rearwardly from the front housing 20 and are configured to engage female clip members 66B (see FIG. 3) on an upper side face of the rear housing 22. Additionally, a lower side face of the rear housing 22 can include two or more offset protrusions 68 configured to receive a lower side of the front housing 20 between the protrusions 68. Accordingly, to assemble the controller housing 16, the lower side of the front housing 20 can be positioned between the protrusions 68 while the upper side of the front housing 20 is angled away from the rear housing 22. The upper side of the front housing 20 can then be moved toward the rear housing 22 until the male clip members 66A engage the female clip members 66B. To disassemble the controller housing 16, this assembly operation can be reversed. More specifically, the male clip members 66A can be disengaged from the female clip members 66B, the upper side of the front housing 20 can be moved away from the rear housing 22, and the lower side of the front housing 20 can be lifted out from between the protrusions 68. While specific fastening elements and assembly methods are shown and described here, it should be noted that other fastening elements or configurations or other assembly methods are contemplated within the scope of the disclosure.

When assembled, the front housing 20 and the rear housing 22 at least partially enclose the control board 18 within the interior of the controller housing 16. However, in some embodiments, the control board 18 can extend outside of the controller housing interior. For example, as shown in FIGS. 2, 3, 5, and 7, a top side of the front housing 20 can include a cutout that exposes an upper portion 70 of the control board 18. Furthermore, as shown in FIGS. 3-6, the rear face of the rear housing 22 can include a mating cutout that exposes the upper portion 70 of the control board 18. The upper exposed portion 70 can include connectors 72 configured to receive one or more communication cables 74, as further described below. Furthermore, in some embodiments, one or more side faces of the rear housing 22 can include one or more cutouts to provide access to the control board 18 when the controller housing 16 is assembled. For example, as shown in FIGS. 2, 4, and 6, one of the side cutouts can permit access to connectors on the control board 18 configured to receive a power supply cable 76 and/or a meter cable 78, as further described below.

Figure 8:
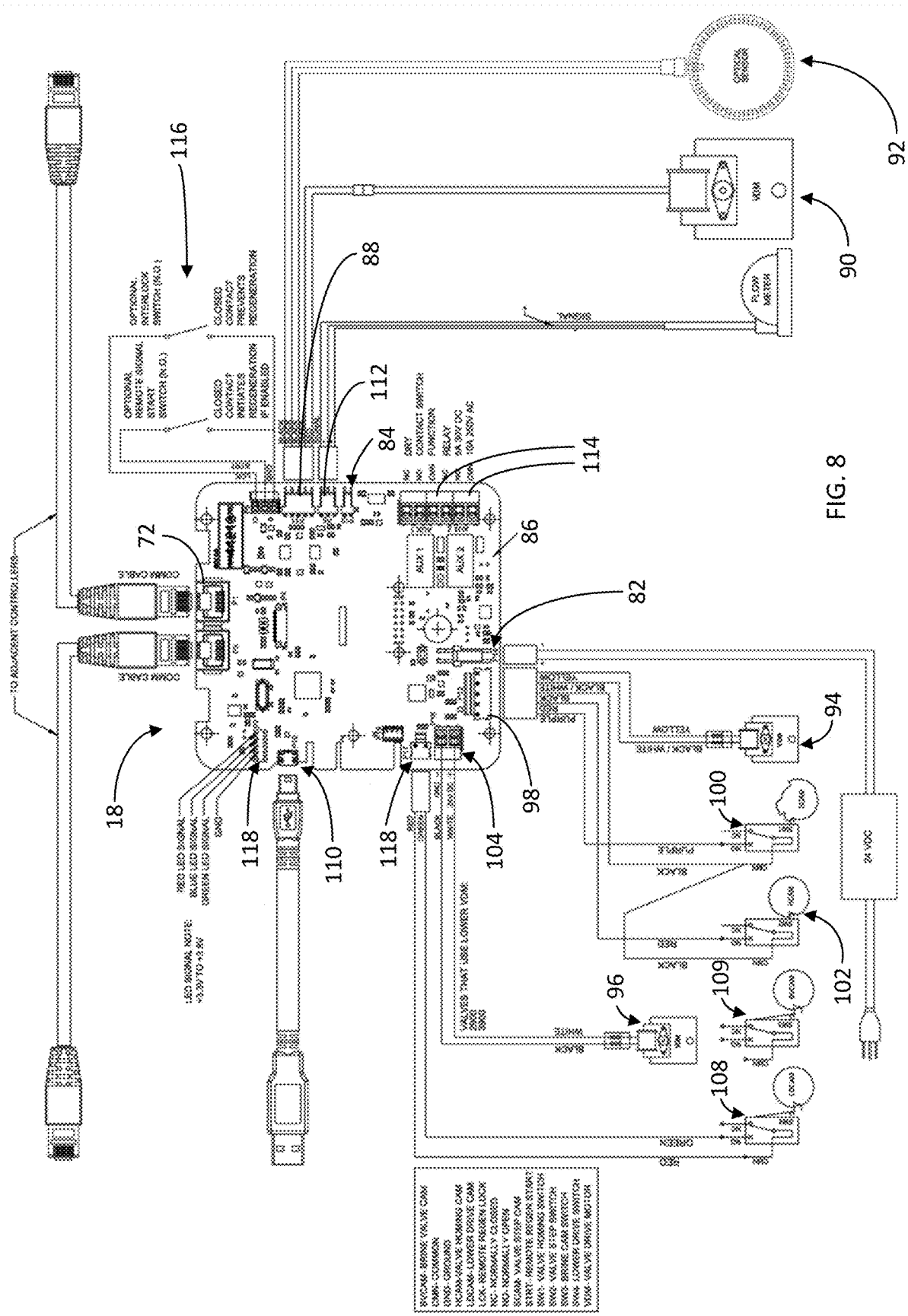
FIG. 8 is a schematic view of a control board of the valve controller of FIG. 2.
Figure 9:
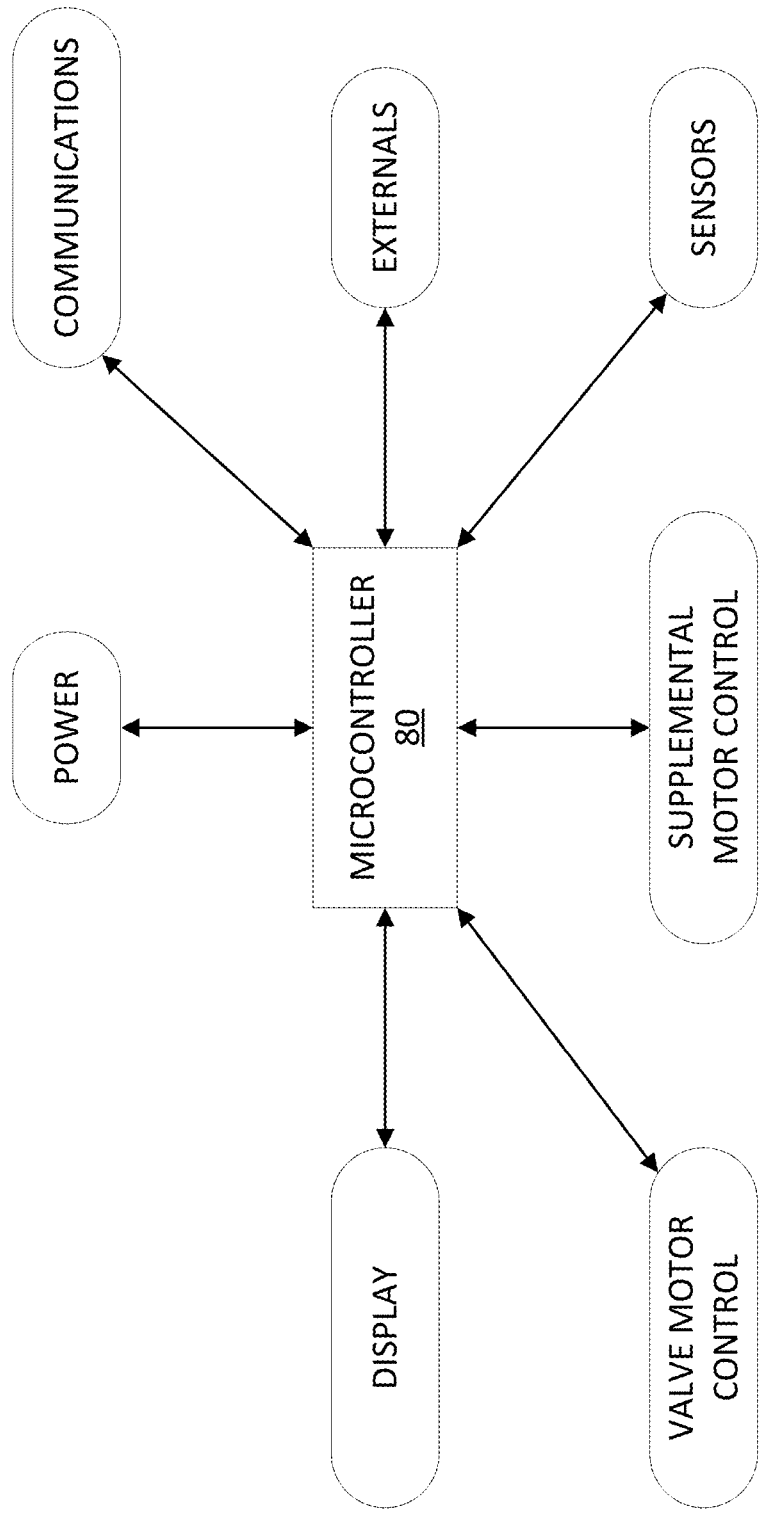
FIG. 9 is a schematic view of a microcontroller for use with the valve controller of FIG. 2 and functions that can be controlled by the microcontroller, in some embodiments.

The control board 18 (e.g., a printed circuit board) can generally include a plurality of connectors, buttons, and/or indicators, as shown in FIG. 8. The control board 18 can also include a microcontroller 80, shown schematically in FIG. 9, and/or other component(s) including processing capabilities and memory. As generally shown in FIG. 9, the microcontroller 80 can control multiple components and features of the controller 14, such as components related to display, power, valve motor control, supplemental motor control, communications, externals, and sensors. As such, system operations or functions may be described herein as generally being controlled by the valve controller 14 or, more specifically, being controlled by the microcontroller 80.

For example, regarding display functions, as noted above and shown in FIG. 7, the display 62 of the user interface 58 can be coupled to the front side of the control board 18 (e.g., via an adhesive coupling 59) and can be electrically connected to the microcontroller 80. The microcontroller 80 can control the display 62 to display information to a user, for example, to provide information to the user and/or to facilitate controller programming via the user interface 58.

With respect to power functions, the control board 18 can include a power connector 82. In some embodiments, the power connector 82 can be a two-pin connector and can receive a power supply cable 76 (as shown in FIGS. 4 and 6) configured to provide a 24 volt DC (VDC) power supply. Additionally, in some embodiments, the control board 18 can include an alternate power connector 84 that can receive a power supply cable 76 (as shown in FIG. 2) configured to provide a 12 VDC power supply. Also, as shown in FIG. 8, the control board 18 can include a reset switch 86. In some embodiments, the reset switch 86 can be actuated to remove or provide power to the power connection (e.g., via a first actuation operation, such as a press or press-and-release operation) and/or to reset the connection (e.g., via a second actuation operation, such as a press-and-hold operation).

With respect to motor and supplemental motor functions, the control board 18 can include a first motor connector 88, such as a five-pin connector. The first motor connector 88 can be coupled to a valve control motor 90 and an optical sensor 92 (e.g., an encoder configured to sense and communicate motor position to the microcontroller 80). In some embodiments, the microcontroller 80 can be configured to operate the valve control motor 90 in forward and/or reverse in order to control operation of an associated valve and can receive motor position information from the optical sensor 92. For example, as further described below, the microcontroller 80 can control the valve control motor 90 (and/or other motors) to operate the valve in order to place the unit 12 in an in service mode, a standby mode, or various cycles of a regeneration mode.

The control board 18 can also include supplemental motor connections, for example, to connect an upper valve drive motor 94 and/or a lower valve drive motor 96. More specifically, the control board 18 can include a second motor connector 98, such as a five-pin connector, connected to the upper valve drive motor 94, a valve step cam and switch 100, and a valve homing cam and switch 102. Additionally, the control board 18 can include a third motor connector 104, such as a two-pin connector, connected to the lower valve drive motor 96. Also associated with the lower valve drive motor 96 is a lower drive cam connector 106, which can be a two-pin connector, configured to be coupled to a lower drive cam and switch 108. In some embodiments, the microcontroller 80 can be configured to operate the upper and/or lower valve drive motors 94, 96 in forward and/or reverse in order to operate an associated valve. Also, in some embodiments, the controller 14 may not include a lower valve drive motor 96. Furthermore, in some embodiments, a brine valve cam 109 (e.g., a switch cam) can be mounted to a motor shaft of one of the motors, such as the upper valve drive motor 94, and can be activated during regeneration.

With respect to communications, as shown in FIG. 8, the control board 18 can include one or more connectors 72 configured to receive communication cables 74 (as shown in FIGS. 2, 4, and 6) that enable communication between controllers 14 and the entire system. Additionally, in some embodiments, the communication cables 74 can be, for example, CAT3 or CAT5 network communication cables.

Furthermore, with respect to communications, the control board 18 can include a connector 110, such as a micro-USB port, configured to receive a data connection cable, such as a micro-USB to USB-C connector cable, allowing an external computer (not shown) to connect to and communicate with the control board 18. In some embodiments, the external computer can receive data from and/or provide data to the microcontroller 80. In addition, or alternatively, the external computer can include a field programmer application configured to permit reprogramming of the microcontroller 80 in the field (e.g., via a USB programming mode of the microcontroller 80).

With respect to externals, as shown in FIG. 8, the control board 18 can include a connector 112 (such as a three-pin connector) configured to be coupled to a flow meter cable 78. The controller 14 can include a flow meter to monitor a volume of treated water used and, more specifically, a volume remaining from a calculated system capacity (e.g., to trigger a regeneration cycle when zero volume remaining is reached, in some applications, and/or to trigger switching other units into an in service mode, in some applications). As such, the flow meter can be configured to communicate a flow rate to the controller 14. The control board 18 can also include one or more auxiliary connectors 114 to connect auxiliary devices. Example auxiliary inputs and outputs can include, but are not limited to, a programmable relay output, a programmable chemical pump output, and/or a remote lockout or remote regeneration input. Furthermore, in some embodiments, the control board 18 can include switch inputs 116 for a remote signal start switch and/or an interlock switch. For example, when actuated, the remote signal start switch can signal the microcontroller 80 to initiate regeneration. Additionally, when actuated, the interlock (or remote lockout) switch can signal the microcontroller 80 to prevent regeneration. The controller 14 may not allow the unit or system to go into regeneration until the interlock switch is opened. Once opened, any queued regenerations can be performed. For example, the lockout feature may be useful in water conditioning systems 10 that could be damaged if bypassed water is output (such as in feeding systems). This feature may also be useful in situations where water pressure is low and performing a regeneration would cause water pressure problems in, for example, a building.

Furthermore, as shown in FIG. 8, the control board 18 can include an integrated circuit 118 with IC outputs configured to connect to indicators 120, such as LEDs, on a front side of the control board 18 (as shown in FIG. 7). For example, the microcontroller 80 can turn on the indicators 120 (e.g., provide inputs to the integrated circuit to activate the indicators 120) to signal various operations. In one embodiment, the microcontroller 80 can turn on a first indicator 120 (e.g., a red LED) to indicate a flow test is being performed. Alternatively, the microcontroller 80 can turn on the first indicator 120 (or another indicator) to indicate an error is present. The microcontroller 80 can turn on a second indicator 120 (e.g., a blue LED) to indicate an encoder test is being performed. Alternatively, the microcontroller 80 can turn on the second indicator 120 (or another indicator) to indicate that the tank is in service (e.g., not in regeneration or standby). The microcontroller 80 can turn on a third indicator 120 (e.g., a green LED) to indicate a regeneration cycle has been initiated. In some embodiments, the microcontroller 80 may also turn on one or more indicators 120 using different on/off (i.e., flashing) patterns to signal various operations. For example, the microcontroller 80 can flash the second indicator 120 (or another indicator) to indicate that regeneration is queued. The microcontroller 80 can flash the third indicator 120 (or another indicator) to indicate that the tank is in standby. While three indicators 120 are shown and described herein, some embodiments may include more or fewer indicators.

Additionally, in some embodiments, the externals can include components associated with other functions. For example, externals can also include circuitry associated with the supplemental (lower) drive cam and the optical sensor of the valve control motor 90.

With respect to sensors, in some embodiments, the controller 14 can include sensors such as, but not limited to, current sensors or condition sensors. Additionally, sensors can include touch sensors associated with the touch pad of the user interface 58. For example, as noted above and shown in FIG. 7, the touch pad assembly 64 can be coupled to the front side of the control board 18 (e.g., via an adhesive coupling 59) and its associated touch pad electrically connected to the microcontroller 80. In some embodiments, the touch pad can provide four capacitive touch sensors. However, in other embodiments, the touch pad can provide more or fewer touch sensors (or, alternatively, the touch pad 64 can be replaced with mechanical buttons or a touch screen). Generally, the microcontroller 80 can receive user input via the touch pad and, in response, display information via the display 62, program or reprogram specific parameters or functions, initiate regeneration, and/or perform other functions.

Figure 10:
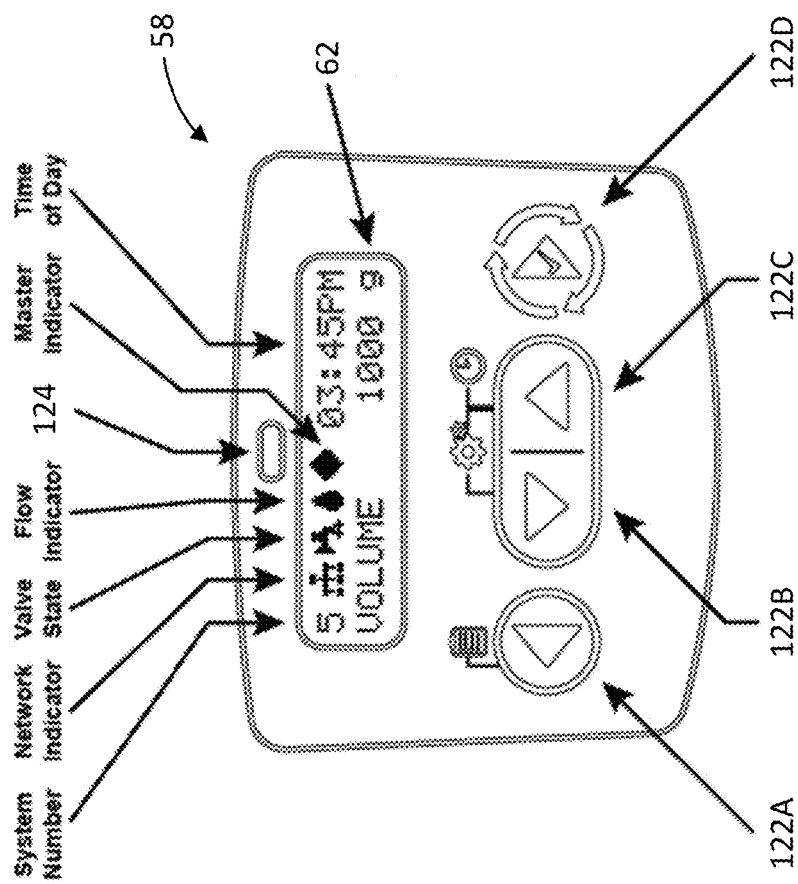
FIG. 10 is a front view of a user interface of the valve controller of FIG. 2.

More specifically, as shown in FIG. 10, the user interface 58 of some embodiments can include one or more buttons 122 (e.g., associated with the touch sensors of the touch pad 64), the display 62, and an indicator window 124 framing the above-described indicators 120. For example, the user interface 58 can include a first button 122A (e.g., a "left" button), a second button 122B (e.g., a "down" button), a third button 122C (e.g., an "up" button), and a fourth button 122D (e.g., an "extra cycle" button). A user can actuate one or more of the buttons 122 in various combinations to provide user input to the microcontroller 80, e.g., to display certain information on the display 62, navigate menu options on the display 62, enter certain menus, enter programming features, change parameters, initiate regeneration, and/or other functions. For example, the user can provide user input by pressing a single button 122, one or more buttons 122 at the same time, and/or one or more buttons 122 in a specific sequence. Additionally, the user can provide user input by pressing one or more buttons 122 via a first actuation operation (e.g., a press or press-and-release operation) or a second actuation operation (e.g., a press-and-hold operation, such as for three seconds or another time period).

For example, in one embodiment, a user can press the left button 122A to navigate to a previous menu option on the display 62, and can press and hold the left button 122A to enter a diagnostic menu (e.g., a diagnostic menu programming mode). A user can press the down button 122B to adjust a menu value down (e.g., a menu value displayed on the display 62), and can press and hold the down button 122B to enter a time of day menu (e.g., a time of day programming mode). A user can press the up button 122C to adjust a menu value up, and can press and hold the up button 122C to enter the time of day menu. A user can press the extra cycle button 122D to navigate to a next menu option on the display 62, and can press and hold the extra cycle button 122D to initiate a regeneration. Additionally, a user can press and hold both the left button 122A and the down button 122B simultaneously to enter a master programming mode, and can press and hold the down button 122B and the up button 122C simultaneously to enter a user programming mode.

As noted above, the microcontroller 80 can control the display 62 to display information to the user, including menu options and values to facilitate programming one or more system parameters. In one embodiment, the display 62 can be a two to four line scrolling text monochrome organic light emitting diode (OLED) display. However, other types of displays may be used in some embodiments, such as an LCD segment display or a TFT color display.

In some aspects, the display 62 can include one or more display sections. For example, as shown in FIG. 10, a first display section can display a time of day. A second display section can alternate between displaying a date, a flow rate, a volume remaining (e.g., as treated water is used, the volume remaining display counts down from a calculated system capacity to zero), and/or a time until regeneration (e.g., if a regeneration is queued). A third display section can display a tank unit number in a multi-unit system and one or more display icons associated with an operation of the tank, current programming parameters, operation of the water conditioning system, and/or other functionality associated with the tank or water conditioning system.

Figure 11:
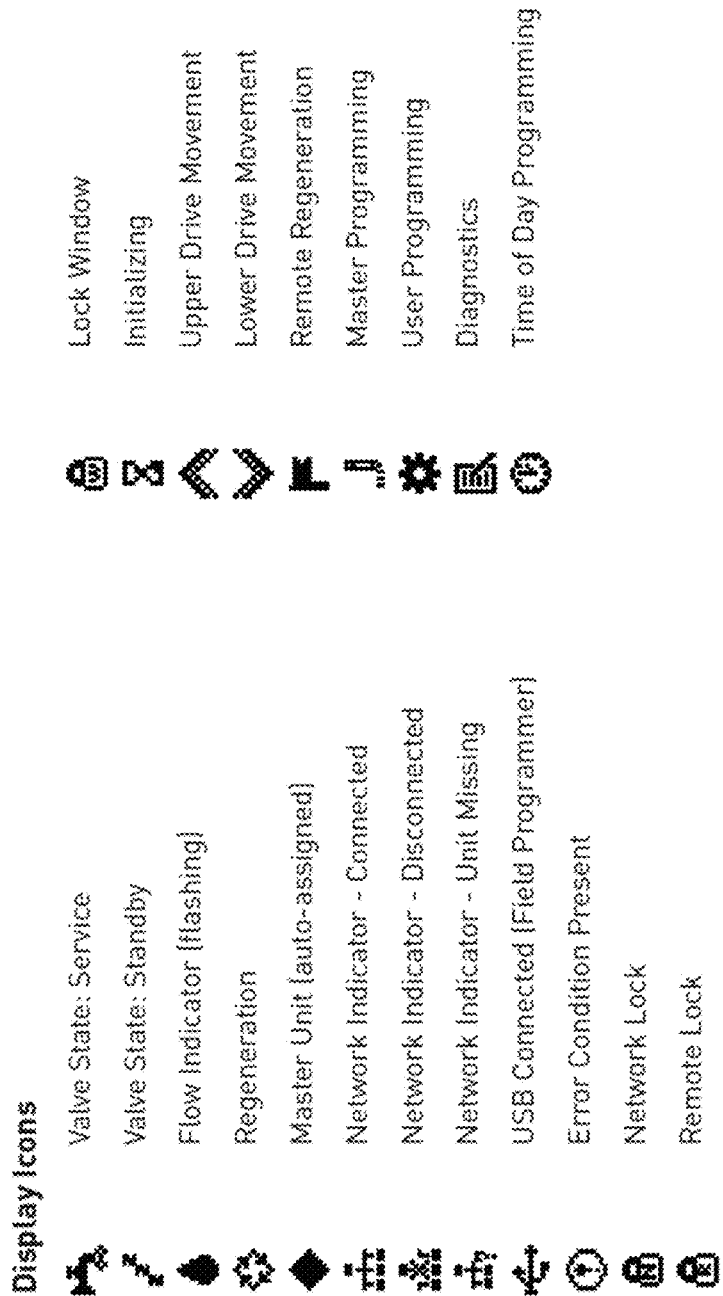
FIG. 11 is a diagram of visual display icons that can be displayed by a display of the user interface of FIG. 10.

FIG. 11 illustrates example display icons according to one embodiment, including the following: a valve state: service icon; a valve state: standby icon; a flow indication icon; a regeneration indication icon; a master unit indication icon; a network indicator—connected icon; a network indicator—disconnected icon; a network indicator—unit missing icon; a USB connected (field programmer) indication icon; an error condition present icon; a network lock icon; a remote lock icon; a lock window icon; an initializing icon; an upper drive movement icon; a lower drive movement icon; a master programming icon; a user programming icon; a diagnostics icon; and a time of day programming icon.

Figure 12:
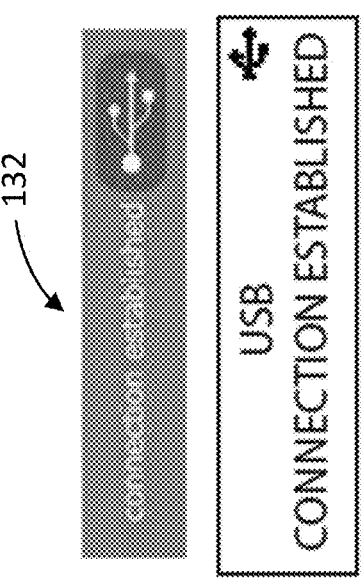
FIG. 12 is a front view of an example display screen of the display of the user interface of FIG. 10.

It should be noted that other display icons, display sections, and/or display options may be contemplated in other embodiments. For example, FIG. 10 illustrates an example of a "normal" display screen that can be displayed during operation of the valve controller 14. However, the display and display sections can change during controller programming, during different operations of the unit (e.g., during standby, in service, and/or regeneration), and/or upon actuation of the one or more buttons. For example, FIG. 12 illustrates an example display screen 132 when a USB connection is established (e.g., via the connection 110, as described above).

Figure 13:
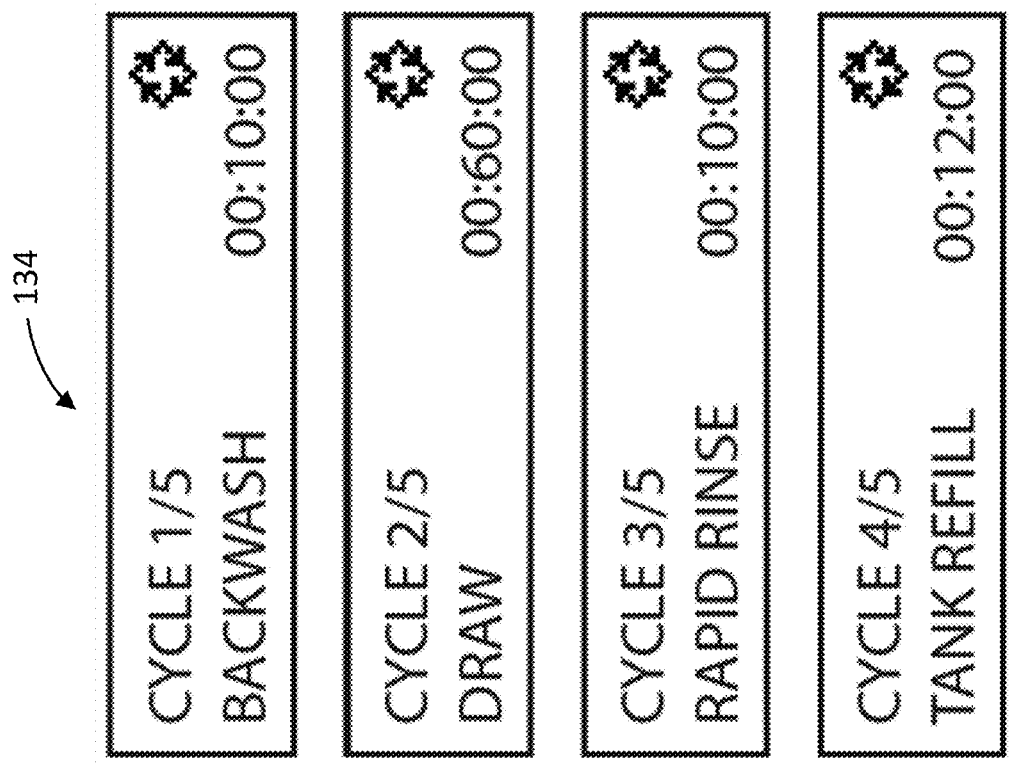
FIG. 13 is a front view of example display screens of the display of the user interface of FIG. 10.

In another example, FIG. 13 illustrates example display screens 134 during a regeneration cycle. As further described below, the controller 14 can trigger a regeneration cycle (e.g., a system regeneration) based on programmed system parameters or manual user inputs. During regeneration, the display 62 can display a current regeneration step (e.g., associated with a valve position) and the time remaining in that step of the cycle. Once all regeneration steps are complete, the controller 14 resumes normal operation by returning to in service or standby modes and reverts back to the normal display screen. In some embodiments, when the unit is in a specific regeneration step (e.g., during a system regeneration or a manually triggered regeneration), a user can press the extra cycle button 122D to immediately advance the cycle to the next step. Additionally, as noted above, a user can manually trigger regeneration by pressing and holding the extra cycle button 122D. In some embodiments, a manually triggered or queued regeneration can be cleared by pressing the left button 122A. A manually triggered regeneration request can also be cleared when a regeneration occurs for any reason prior to the manually triggered regeneration time. However, in some embodiments, a system-queued regeneration can only be cleared by stepping through the regeneration (e.g., by pressing the extra cycle button 122D to advance the cycle to completion).

With respect to system-triggered regenerations and other system operations, as noted above, the controller 14 can be used in a single-unit water conditioning system 10, or multiple controllers can be networked in a multi-unit water conditioning system 10 including two to eight, or more, units 12. In such multi-unit systems 10, the controllers 14 can communicate with each other via the communication cables 74 (such as CAT3 or CAT5 cables up to, for example, 100 feet in length). More specifically, the controllers 14 can communicate with each other to share information and coordinate timing of in service, standby, and regeneration modes of units 12 in the system 10.

For example, each controller 14 can send a periodic ping across the network at regular intervals, and all controllers 14 in the system 10 can receive the message. In other words, the controller 14 can send a ping at a constant speed to all other units 12 in the network. In some applications, a master controller 14 can be appointed to coordinate which units 12 are allowed to regenerate and which units 12 are in service or standby at a given time. As such, the controllers 14 can send regeneration requests across the network and the master controller 14 can send messages, in the form of commands, that communicate regeneration, in service, and standby behaviors to the controllers 14 based on the received regeneration requests and the system type, as further described below. In some embodiments, all other slave controllers 14 (that is, other than the master controller 14) can immediately send an acknowledgement response if a message is received from the master controller 14. However, in other embodiments, the controllers 14 may not send a response when such a message is received.

As all units 12 receive every message on the network, messages can be coded to identify a target unit 12 for whom the message is intended. More specifically, each controller 14 can include a particular ID or address, and each message can include an ID or IDs that matches the controller or controllers 14 for which the message is intended. As a result, to know whether it should act upon the requested behavior in a received message, each controller 14 can inspect the data in the message to see if it matches its own ID. Additionally, some instructions may be divided into multiple messages, for example, if the instructions will not fit within a single message. Accordingly, each controller 14 can be hardcoded to know which message types must be re-assembled and what the total size needs to be when re-assembled. In some embodiments, to accomplish communication across the network, the controllers 14 implement a CAN hardware communication protocol, and can communicate across a CAN bus. Additionally, while wired connections are described and shown herein, in some embodiments, linked controllers 14 can communicate via wireless connections.

As noted above, the controllers 14 can coordinate which units 12 are allowed to regenerate and which units 12 are in service or standby at a given time based on a system type. Different types of multi-unit systems 10 can include, but are not limited to, parallel interlock systems, parallel series regeneration systems, alternating interlock systems, alternating delayed systems, alternating with standby unit systems, and demand recall systems, as further described below. It should be noted that, while specific system examples are described, in some embodiments, these systems may include different features. Also, additional system types may be contemplated including a combination of one or more features described herein. In some embodiments, the following types of regeneration control can be implemented in certain systems 10: softener/filter meter delayed; softener/filter meter immediate; time clock; day of the week; and remote regeneration. Furthermore, in some embodiments, the systems 10 can include the following types of regeneration flow: down flow, up flow, filter.

FIG. 14 illustrates example programming parameters and ranges that can be programmed into a controller 14 for different types of systems 10. For example, in a single-unit system 10 (indicated at "4" in FIG. 14), time clock, immediate, delayed, and remote signal start functions may be available. No meter monitoring may be necessary for time clock regeneration control; however, the controller 14 can use the flow meter for immediate and delayed functions.

In a parallel interlock system 10, including two or more units 12 (indicated as "5" in FIG. 14), all tanks are in parallel supplying treated water. Each unit 12 in the system 10 can have its own flow meter and/or sensor input. The controller network can delay the start of regeneration in one unit 12 if another unit 12 is already in regeneration. Once that first unit 12 has completed a regeneration cycle and has returned to service, the unit 12 with the longest regeneration queue time can begin regeneration. As a result, no more than one unit 12 is in regeneration at a time.

In a parallel series regeneration system 10, including two or more units 12 (indicated as "6" in FIG. 14), all tanks are in parallel supplying treating water. Only a first controller 14 (e.g., a master controller, for example, associated with valve address #1) monitors flow and/or sensor input and regenerates the system 10 in series order: a first unit 12 (e.g., valve address #1), immediately followed by a second unit 12 (valve address #2), then a third unit 12 (valve address #3), and so on for all units 12 in the system 10. As a result, no more than one unit 12 is in regeneration at a time.

In an alternating interlock or alternating immediate system 10, including, for example, two units 12 (indicated as "7" in FIG. 14), one unit 12 is online supplying treating water while the other unit 12 is in standby. Only a first controller 14 (e.g., a master controller, for example, associated with valve address #1) monitors flow and/or sensor input. Regeneration of a unit 12 will begin after the other controller 14 has left standby and returned to service. When the regeneration cycle is complete, the regenerated unit 12 will enter standby. For example, standby can be controlled by the supplemental motor drive output of the controller (e.g., by activating the lower drive motor to place the associated valve in standby).

In an alternating delayed system 10, including, for example, two units 12 (indicated as "8" in FIG. 14), one unit 12 is online supplying treated water while the other unit 12 is in standby. Only a first controller 14 (e.g., a master controller, for example, associated with valve address #1) monitors flow and/or sensor input. An online unit 12 operates in service until it depletes its volume. Once this occurs, the offline unit 12 comes online. The previously online (that is, depleted) unit 12 goes offline and delays its regeneration until a programmed regeneration time as been reached. This may also be considered an immediate transfer delayed regeneration system. In some embodiments, this system 10 may be used in place of the alternating interlock system 10 in situations where water pressure is low such that service water and water for regeneration cannot be supplied at the same time.

In an alternating with standby units system 10, including two or more units 12 (indicated as "9" in FIG. 14), one, two, or three units 12 are online supplying treating water while at least one unit 12 is in standby. Each controller 14 monitors flow and/or sensor input. Regeneration of a unit 12 will begin after the other controller 14 has left standby and returned to service. When the regeneration cycle is complete, the regenerated unit 12 will enter standby. For example, standby can be controlled by the supplemental motor drive output of the controller (e.g., by activating the lower drive motor to place the associated valve in standby).

In a demand recall or progressive flow system 10, including two or more units (indicated as "14" in FIG. 14), each controller 14 monitors flow and/or sensor input and units 12 are placed in service or standby mode based on flow demand. For example, in some embodiments, a first unit 12 (e.g., valve address #1) will begin in service, and second, third, and/or fourth units 12 (if installed) begin in standby. At least one unit 12 remains in service at all times. When a flow rate to a primary service unit 12 increases to a user-specified rate, the next unit 12 in sequence will move from standby to in service. As the flow rate falls below the user-specified rate, subsequent units 12 will return to standby. When the primary service unit 12 regenerates, the next unit 12 in sequence will become the new primary service unit 12. As each unit's capacity is reached, the respective controller 14 will initiate regeneration of that unit 12. Depending on the number of units 12 in the system 10 and flow rate demand, a regenerated unit 12 will either be placed into standby or in service. In some embodiments, only one unit 12 may be in regeneration at a time.

In addition to the flow-rate based function of the demand recall system 10, in some embodiments, if two or more units 12 in service are depleted, additional available units 12 can be brought into service so that the system 10 continues to supply treated water. This allows the system 10 to continue to supply treated water even if the flow rate would not normally necessitate additional units 12 in service (e.g., even if the flow rate does not exceed the user-specified rate). In other words, additional tanks may be placed in service if a current in service tank is depleted, independent of the current flow rate. This additional feature of the demand recall system 10 can provide a more consistent supply of treated water.

Figure 15A:
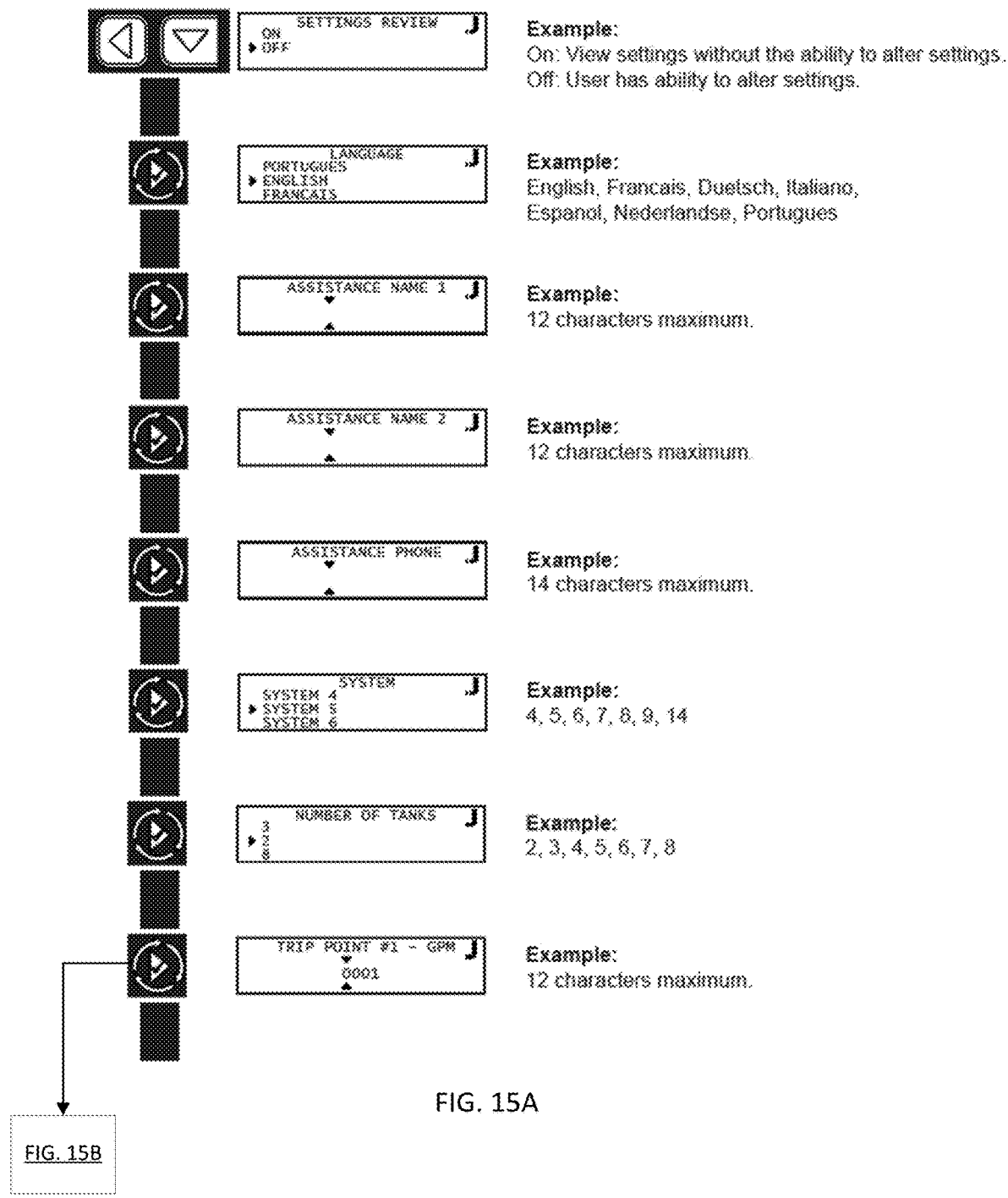
FIG. 15A is a flow diagram of a master programming mode of the valve controller of FIG. 2, according to some embodiments.
Figure 15B:
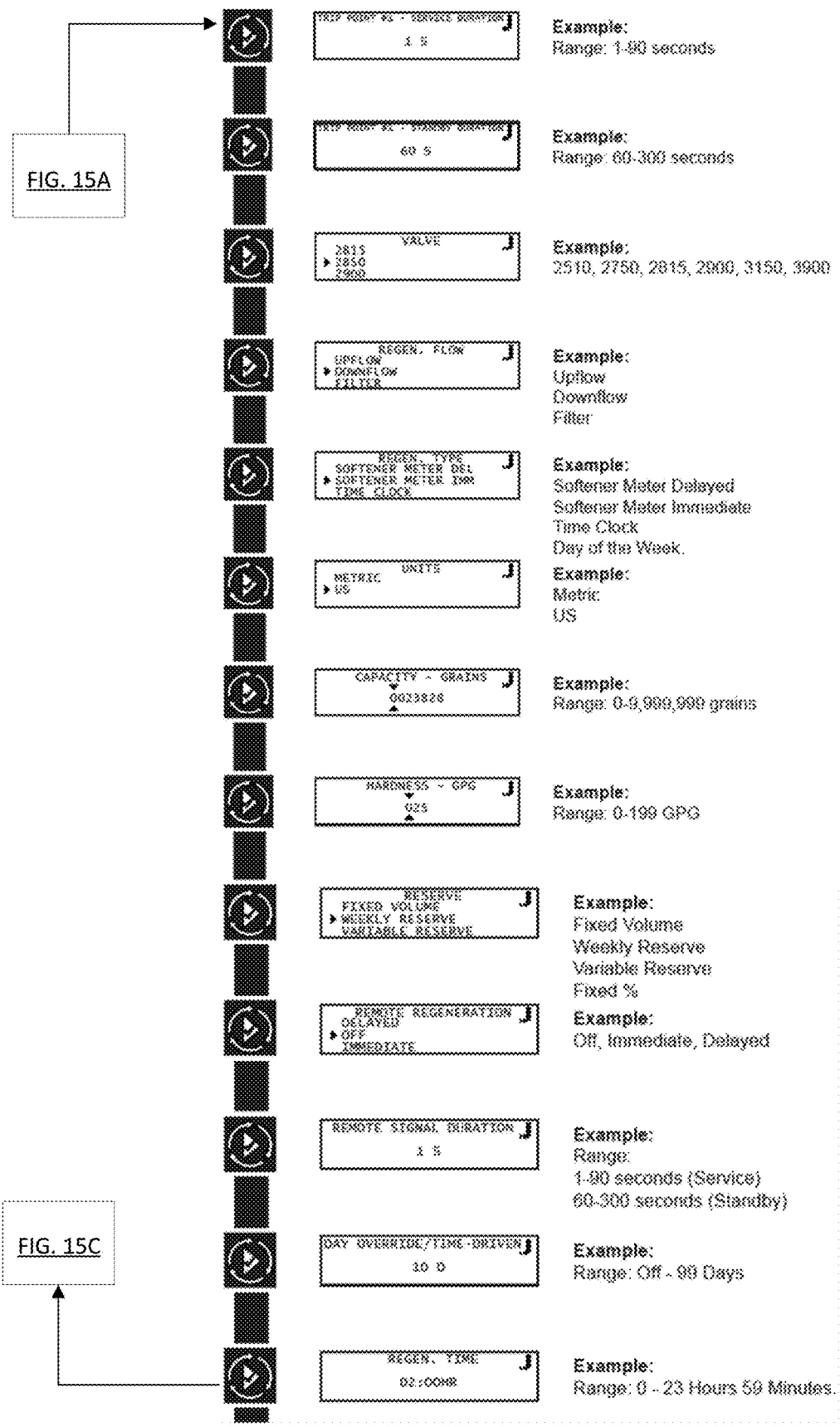
FIG. 15B is a continuation of the flow diagram of FIG. 15A.
Figure 15C:
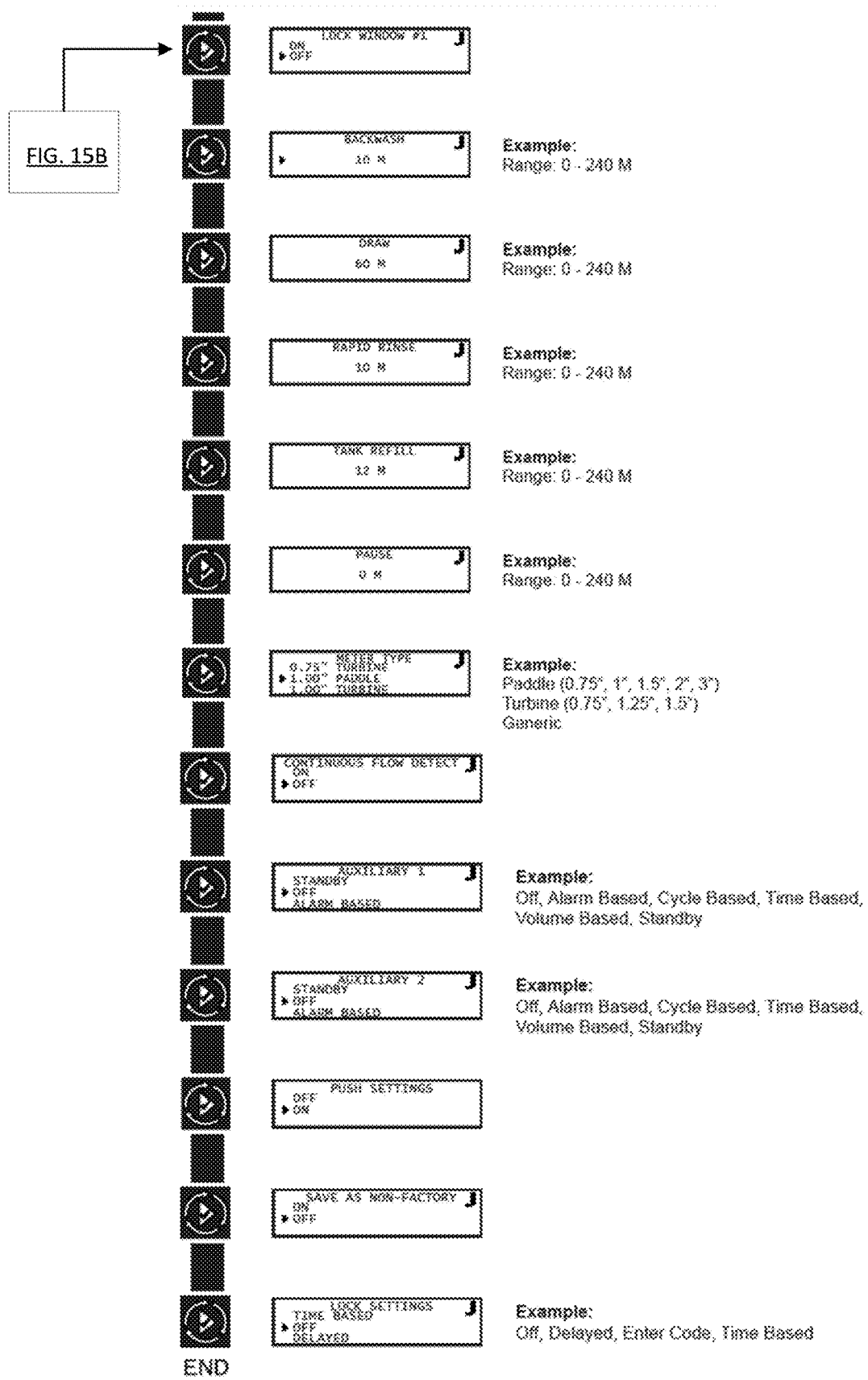
FIG. 15C is a continuation of the flow diagram of FIG. 15B.
Figure 16:
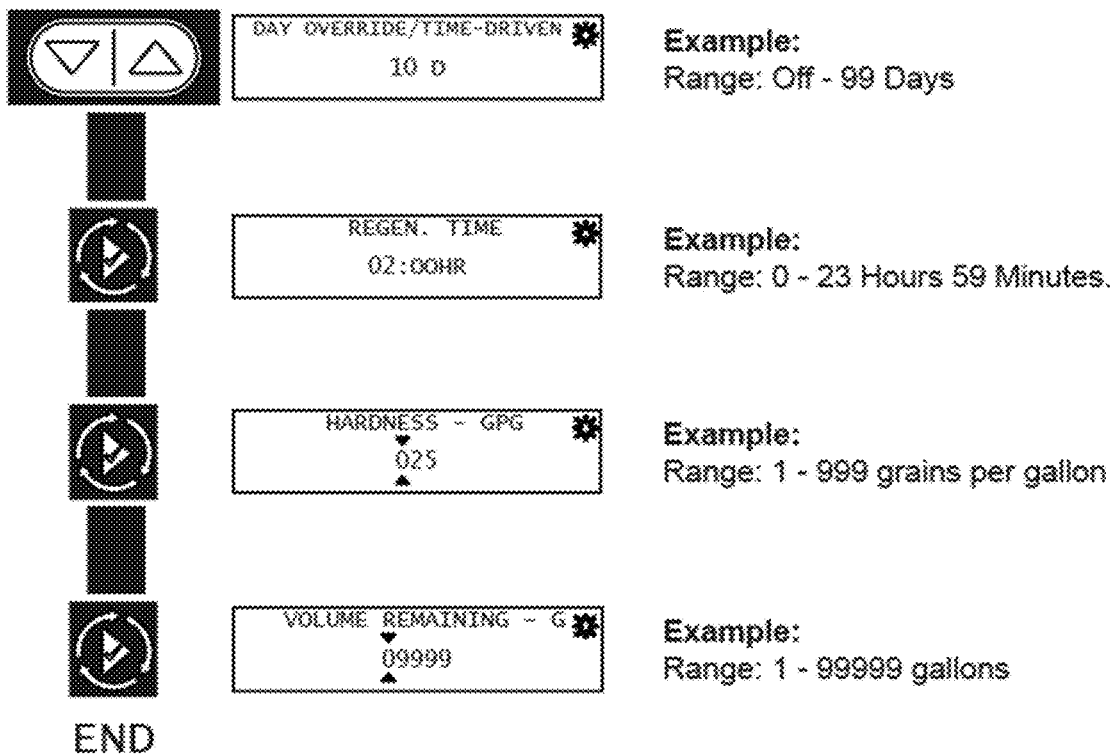
FIG. 16 is a flow diagram of a user programming mode of the valve controller of FIG. 2, according to some embodiments.
Figure 17:
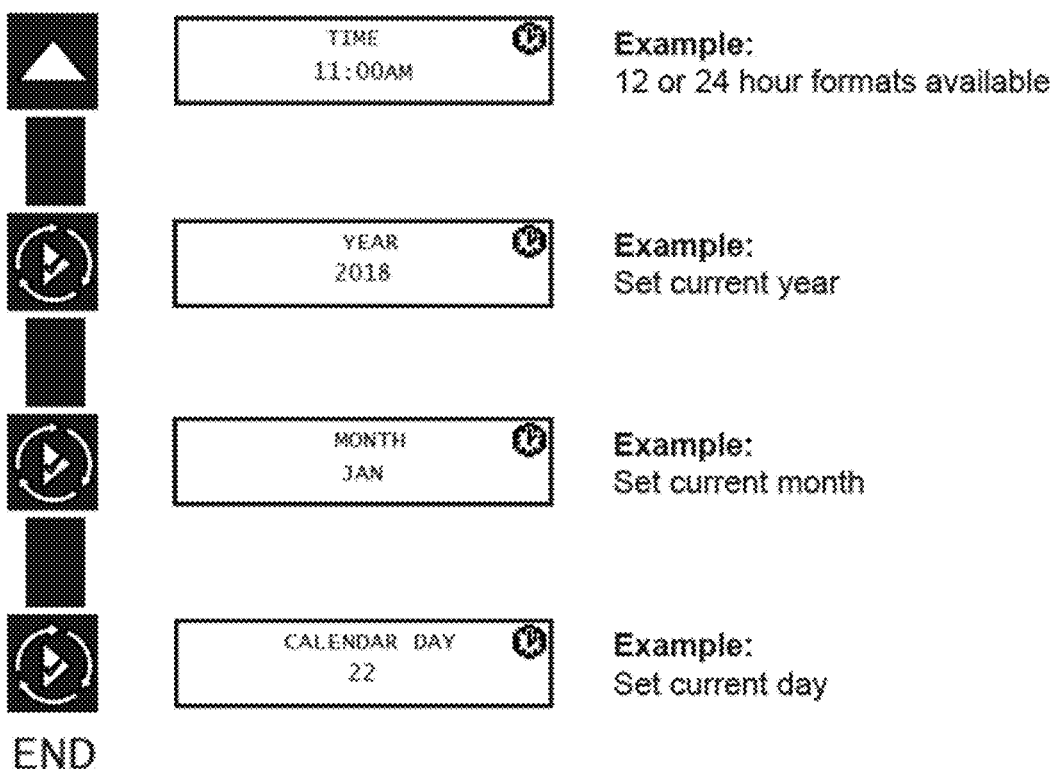
FIG. 17 is a flow diagram of a time of day programming mode of the valve controller of FIG. 2, according to some embodiments.
Figure 18B:
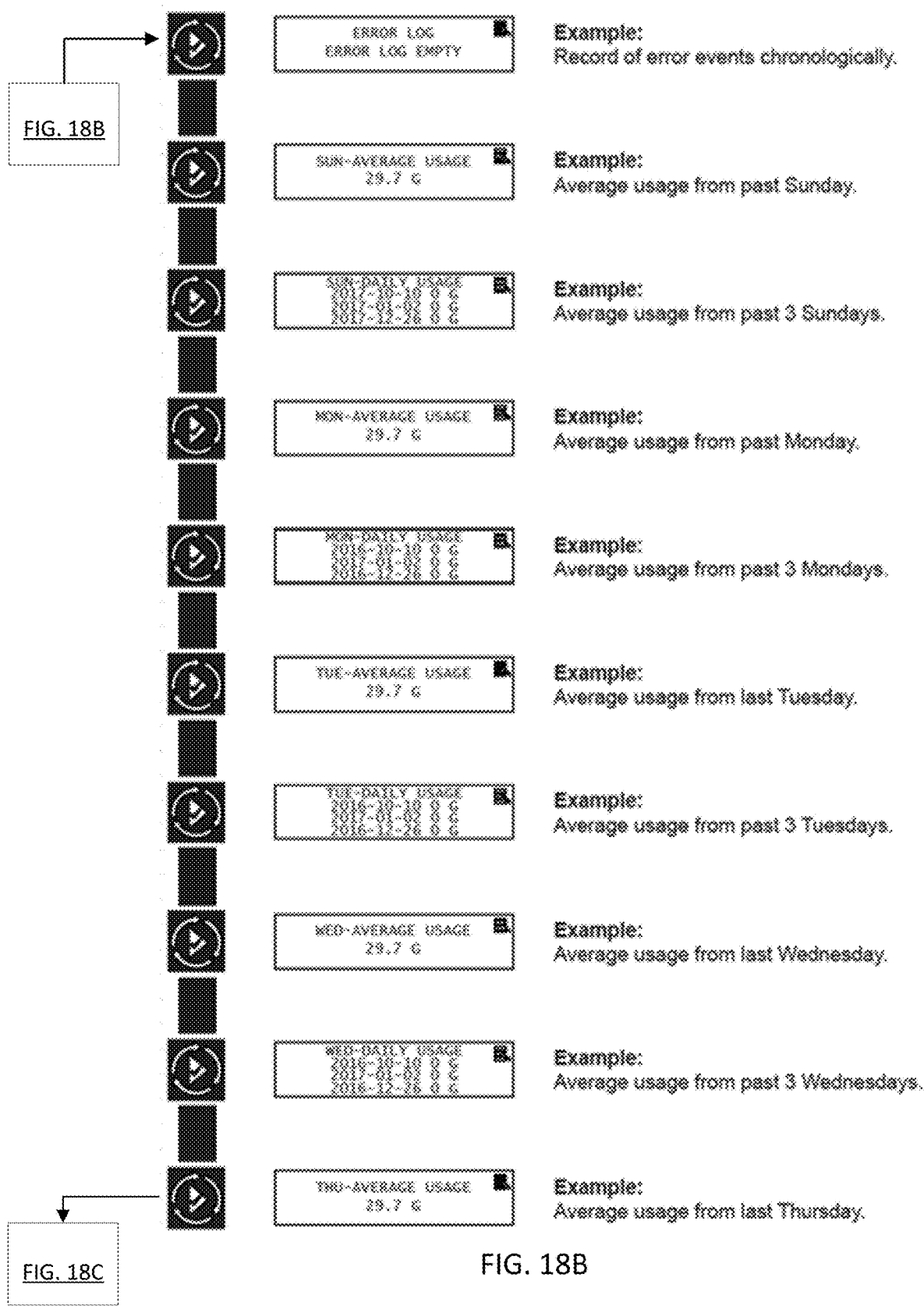
FIG. 18B is a continuation of the flow diagram of FIG. 18A.
Figure 18C:
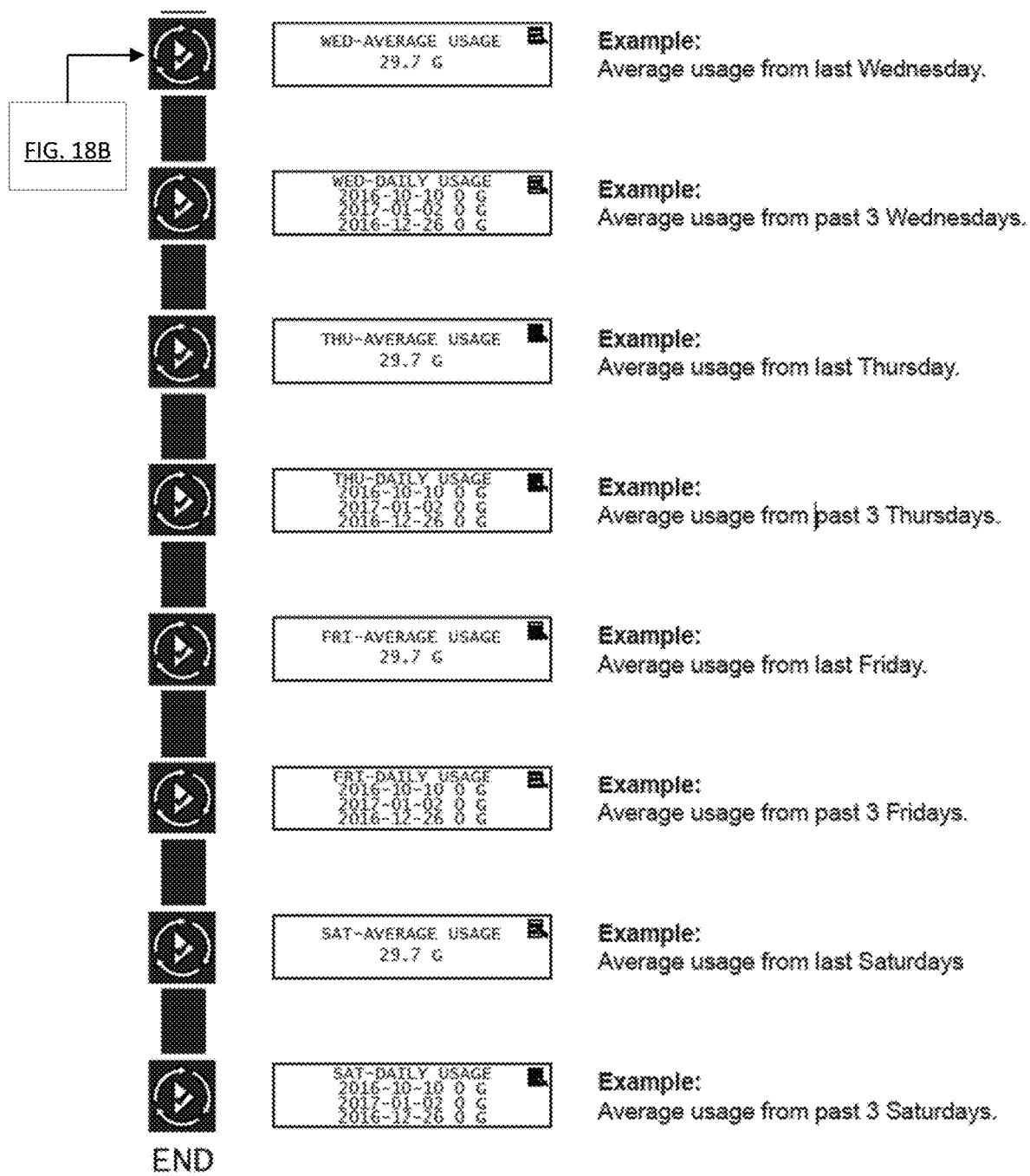
FIG. 18C is a continuation of the flow diagram of FIG. 18B.

As noted above, FIG. 14 illustrates parameters for each system type. FIGS. 15A-18C further illustrate flow charts for programming modes of a controller 14. For example, FIGS. 15A-15C illustrate a master programming mode flow chart, FIG. 16 illustrates a user programming mode flow chart, FIG. 17 illustrates a time of day programming mode flow chart, and FIGS. 18A-18C illustrate a diagnostic programming mode flow chart. As shown in FIGS. 15A-18C, each programming mode can include a plurality of menu options and each menu option can include respective parameter values. As used herein, menu options and parameter values can be considered system settings of the controller 14. Generally, the controller 14 can enter a programming mode when in standby or service mode, as long as the unit 12 is not in regeneration. While in a programming mode, the controller 14 can continue to operate normally, monitoring water usage. Furthermore, adjustments made to system parameters during programming modes can be stored in memory of the controller 14 permanently.

With respect to the master programming mode, as described above, a user can enter the master programming mode by pressing and holding the left button 122A and the down button 122B of the user interface 58. When in the master programming mode, a user can toggle menu options, for example, using the left button 122A (e.g., to retreat to a previous menu option) and the extra cycle button 122D (e.g., to advance to a next menu option). In some embodiments, displayed parameter values for menu options can be local parameter values (e.g., as opposed to system values). Where applicable, the user can adjust a parameter value for particular a menu option using the down button 122B and the up button 122C, and/or advance or retreat text or numerical characters using the left button 122A and the extra cycle button 122D. To reset or clear values, the down and up buttons 122B, 122C can be simultaneously pressed and held for a time duration, such as five seconds. A user can exit the master programming mode by cycling through all available menu options. Alternatively, the controller 14 can automatically exit the master programming mode after a time of inactivity, such as five minutes. Also, if a regeneration occurs while in the master programming mode, the controller 14 exits the programming mode and the regeneration step and time remaining can be displayed until regeneration is complete, at which time the normal display screen will be displayed.

In some embodiments, as shown in FIGS. 15A-15C, the master programming mode can include a menu option related to locking settings. The lock settings option can provide multiple selections to enable a user to lock the master programming settings in a preferred manner, thus ensuring that entered settings are protected. More specifically, the lock settings option can include the following selectable parameter values for locking settings: a button hold delay requirement, a passcode requirement, a time-based (or clock time) requirement, and/or other options, including an "off" selection. In other words, the microcontroller 80 can restrict access to the master programming settings (that is, menu options and parameter values) based on a button hold delay requirement, a passcode requirement, or a clock time input requirement. For example, if the user selects the button hold delay option, the user must press and hold a specific button for a longer duration than normal (such as sixty seconds) to access the master settings. If the user selects the passcode option, any subsequent master programming mode access requires the user to input a specific access code (such as a four-digit access code). If the user selects the clock time option, the user must set the clock to a specific time (such as 12:01) in order to access to the master programming mode. Additionally, the user can disable the settings lock so that there are no restrictions to entering the master programming mode (i.e., by selecting the "off" parameter).

The lock settings option provides more ways for a user to lock the master programming mode, allowing a user to choose an option that best suits their needs. In some embodiments, the controller 14 can include a similar lock setting option as a network lock (e.g., which allows the user to lock access to network settings). In addition to the lock settings option, entered settings can be further protected by a non-factory reset settings option in the master programming mode. More specifically, by selecting this option during master programming, a user can store the current master settings as non-factory reset settings (e.g., as a non-factory reset version of the master settings). These non-factory settings can be loaded at a later time regardless of any subsequent modifications to the settings. For example, in some embodiments, while powering up the unit 12, the user can press and hold the extra cycle button 122D to access a reset menu. From the reset menu, the user can reset the master settings to the stored non-factory reset settings or to factory defaults. Furthermore, in addition to the above lock settings, a lock window option can prevent regeneration during a specified time period (in addition to the remote lockout switch, described above, which can prevent regeneration when actuated).

In some embodiments, the master programming mode can also include a day override menu option. This menu option can include parameter values such as "off," and a range of numerical values from, for example, 1 to 99 days. If the day override option is enabled (that is, not off), when the unit 12 reaches the preset regeneration day override value (e.g., 1 to 99 days), a regeneration cycle is triggered, regardless of remaining volume available. If other units 12 are in regeneration, the unit 12 can be added to the regeneration queue. In some embodiments, the day override menu option may also be available in the user programming mode.

Furthermore, with respect to the user programming mode, as described above, a user can enter the user programming mode by pressing and holding the down button 122B and the up button 122C of the user interface 58. When in the user programming mode, a user can toggle menu options, for example, using the left button 122A (e.g., to retreat to a previous menu option) and the extra cycle button 122D (e.g., to advance to a next menu option). Where applicable, the user can adjust a parameter value for a menu option using the down button 122B and the up button 122C (and/or advance or retreat text or numerical characters using the left button 122A and the extra cycle button 122D). In some embodiments, displayed parameter values for menu options can be local parameter values (e.g., as opposed to system values). A user can exit the user programming mode by cycling through all available menu options or pressing and holding the left button 122A. Alternatively, the controller 14 can automatically exit the user programming mode after a time of inactivity, such as five minutes. Also, if a regeneration occurs while in the user programming mode, the controller 14 exits the programming mode and the regeneration step and time remaining can be displayed until regeneration is complete, at which time the normal display screen will be displayed.

With respect to the time of day programming mode, as described above, a user can enter the time of day programming mode by pressing and holding the up button 122C of the user interface 58. In the time of day programming mode, menu options such as time, year, month, and calendar day can be set. For example, in one embodiment, when entering the time of day programming mode, a time option may be displayed, and a user can press the down or up buttons 122B, 122C to adjust the time. The user can then press the extra cycle button 122D to advance to a year option and adjust the year as desired, then advance to a month option and adjust as desired, then advance to a calendar day option and adjust as desired. After adjusting the calendar day, the user can press the extra cycle button 122D to return to the normal display screen. In some embodiments, the microcontroller 80 can store the adjustments in memory (e.g., permanently) upon the user advancing to a next menu option or upon the user exiting the time of day programming mode. Alternatively, a user can press and hold the left button 122A to return to the normal display screen without saving any adjustments.

In some embodiments, the controller 14 can include a capacitor backup for power losses, e.g., up to eight hours or up to twelve hours, to prevent losing time of day parameter values. For example, all system parameters can be stored in permanent memory. During a power failure, parameters such as current valve position, cycle step time elapsed, and/or time of day can remain stored and can be restored when power is reapplied. In other words, the controller 14 can keep time during a power failure (e.g., via the capacitor backup), and then current time of day can be adjusted upon power up. In some embodiments, the time of day on the normal display screen can flash when there has been a power outage.

In some embodiments, some or all system parameters in the master programming mode, the user programming mode, and/or the time of day programming mode that have been modified at one controller 14 can be sent to all other units 12 in a system 10, without the user having to manually change the settings at each controller 14. For example, when the user modifies master or user programming settings at one controller 14, a push menu option may also be available (e.g., having "on" or "off" parameter values). If the push menu option is selected (that is, if the "on" value is selected), the controller 14 can push all current settings to the other controllers 14 in a series of CAN messages over the network. The other controllers 14 can receive the messages and update their settings to match. This allows for a user to modify the settings of every controller 14 in a system 10 by accessing only a single controller 14. Additionally, in some embodiments, when the user modifies time of day settings at one controller 14, the controller 14 can automatically send a message to all other controllers 14 to update their time of day settings to match. Accordingly, in some embodiments, a user may only have to access and program one controller 14 in the system 10, and such programmed settings can then be propagated to other units in the network, enabling easier system programming and reducing inconsistencies caused by user error.

To further ease system programming for a user, in some embodiments, the controller 14 can include a dynamic addressing and master selection function. More specifically, in previous systems, users would need to manually input address assignments into each network controller 14 and select a master controller 14. In embodiments of the present system 10, dynamic addressing can allow for automatic address assignments and master unit selection, for example, based on one or more algorithms stored in memory of the controller 14. As a result, the dynamic addressing and master selection functions can ease user programming and also reduce user mistakes when assigning addresses.

For example, in some embodiments, a controller 14 can begin by randomly obtaining an address. For example, the controller 14 can select a number, such as 0-7, based on an internal hardware timer to make the selection random. The controller 14 can then communicate that selected address through a status message sent out on the network. If the controller 14 detects a collision on the network, that is, a ping from another controller 14 indicating that it is already using that address, the controller 14 will randomly select another available address. The controller 14 will continue to select a new address and send out messages until no collisions exist, indicating that no other controllers 14 on the network have that selected address. For example, after a collision, the controller 14 can increment the selected address (e.g., move from 0 to 1, 1 to 2, etc.) until an unused address is found. This address assignment process can be performed when the controller 14 or system 10 is powered on, or whenever a unit address collision occurs during system operation (e.g., through reception of a ping from another unit 12). Furthermore, in one embodiment, the master unit 12 can be selected based on flow meter presence or a specific unit address, e.g., based on the type of system 10. In one example, the unit 12 having address 0 or address #1 can be selected as the master unit 12.

Referring now to the diagnostic programming mode, as described above, a user can enter the diagnostic programming mode by pressing and holding the left button 122A of the user interface 58. When in the diagnostic programming mode, a user can toggle menu options, for example, using the left button 122A (e.g., to retreat to a previous menu option) and the extra cycle button 122D (e.g., to advance to a next menu option). Where applicable, the user can adjust a parameter value for a menu option, if such value is an adjustable value, using the down button 122B and the up button 122C (and/or advance or retreat text or numerical characters using the left button 122A and the extra cycle button 122D). To reset or clear parameter values, if such values are resettable, the down and up buttons 122B, 122C can be simultaneously pressed and held for a time duration, such as five seconds. In some embodiments, displayed parameter values for menu options can be local parameter values (e.g., as opposed to system values). A user can exit the diagnostic programming mode by cycling through all available menu options or holding the left button 122A. Alternatively, the controller 14 can automatically exit the diagnostic programming mode after a time of inactivity, such as five minutes. Also, if a regeneration occurs while in the diagnostic programming mode, the controller 14 exits the programming mode and the regeneration step and time remaining can be displayed until regeneration is complete, at which time the normal display screen will be displayed.

In some embodiments, as shown in FIGS. 18A-18C, the diagnostic programming mode can provide information to the user including, but not limited to, real-time flow rate, peak flow rate, totalizer, reserve capacity, usage since last regeneration, last regeneration, software version, total number of regenerations, regeneration interval, last settings change, an error log, and an average daily usage. With respect to the error log, previous systems displayed error logs with codes and limited or no history. A user would then have to look up the code to understand the current error, and would not be able to review past errors. In some embodiments, the microcontroller 80 can display a non-volatile error log with full descriptions and timestamps (e.g., date and time of occurrence) via the display 62. In some embodiments, the user can scroll the error log on the display 62 via the down and up buttons 122B, 122C. The more robust error log of some embodiments can enable better and more efficient use of the system 10 by, for example, allowing a user to see and understand error patterns. Furthermore, this feature can assist water professionals as well as internal quality and engineering personnel to diagnose system problems in the field as well as in controllers 14 returned by users. In some embodiments, the error log can store one or more of the following errors: motor stall; motor run on; optical encoder error; emergency regen; 100 days without regen; service interval; motor over-current; memory corruption; no salt; no flow for one week; bad conductivity probes; continuous flow error; cam switch error; CAN disconnect error; and/or CAN system mismatch error. Additionally, in some embodiments, the error log (as well as other diagnostic information) can be downloaded to an external computer via the USB connection 110.

In addition to providing information through the programming modes, the display 62 can automatically display error messages to the user. For example, if an error condition is detected, an error screen can alternate with the normal display screen every few seconds (or another time period). In some embodiments, in a multi-unit system, the error message can be toggled on all of the controllers 14. FIG. 19 illustrates example error messages, causes for such error messages, and user corrections. One example error condition is a continuous flow detection error, where flow (e.g., monitored by the flow meter) exceeds a specified threshold for a specified duration. In some embodiments, the specified threshold can be between about 0.5 gallons per minute (GPM) or about 1 liter per minute (LPM) and the specified during can be about 8 hours. These values can be permanent factory settings or programmed settings that are adjustable through one of the programming modes. A user can clear the continuous flow detection error condition by triggering a manual regeneration.

In some embodiments, when an error condition is detected, all units 12 in service can remain in service, all units 12 in standby can go to in service and any units 12 in regeneration can complete regeneration and go to an in service mode. Additionally, in some embodiments, no units 12 may be allowed to start a regeneration cycle while the error condition exists, unless they are manually forced into regeneration. Furthermore, during the error condition, the controller 14 can continue to monitor the flow meter and update the volume remaining. When an error condition is corrected and the error no longer displays, the system 10 can return to normal operation. For example, the units 12 can return to the operating status they were in prior to the error condition. A regeneration queue can be rebuilt according to the normal system operation or, if more than one unit 12 has been queued for regeneration, the queue can be rebuilt according to which unit 12 communicates with the master controller 14 first.

Additionally, in some embodiments, each controller 14 can include one or more of the following operating parameters: 20 pounds per square inch (psi) minimum pressure; 125 psi maximum pressure; 110 degrees Fahrenheit (F) maximum water temperature; 34 degrees F. minimum ambient temperature; 120 degrees F. maximum ambient temperature; 75% maximum humidity; 100-240 volts AC (VAC) input voltage; 50/60 Hertz (Hz) input frequency; 24 VDC or 12 VDC output voltage; 2.7 amps output current; 2,000 meters maximum altitude; and 24 VDC electrical rating.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A valve arrangement in a water conditioning system, the valve arrangement comprising:
a valve controlled by a motor; and
a valve controller coupled to the valve and provided in the form of:
a controller housing;
a user interface on the controller housing, the user interface including a display and one or more buttons designed to receive user inputs; and
a control board supported by the controller housing, the control board including a microcontroller in communication with the display, the one or more buttons, and the motor, the microcontroller designed to execute computer-readable instructions, which, when executed, cause the microcontroller to:
communicate with one or more other valve controllers in the water conditioning system,
store a plurality of system parameters in memory,
control the motor to operate the valve based on one or more of the system parameters,
update one or more of the system parameters based on the user inputs received through the user interface, and
push the updated system parameters to the one or more other valve controllers in the water conditioning system.

2. The valve arrangement of claim 1, wherein the microcontroller is further configured to restrict access to the plurality of system parameters unless a specified user input is received, the specified user input including one of a pre-set button hold delay, a pre-set passcode, or a pre-set clock time.

3. The valve arrangement of claim 1, wherein the microcontroller is further configured to store a non-factory reset version of the plurality of system parameters in the memory, and wherein updating the one or more system parameters includes resetting the system parameters to the non-factory reset version.

4. The valve arrangement of claim 1, wherein the microcontroller is configured to push the updated system parameters to the one or more other valve controllers in the water conditioning system in response to a push menu option, selected via the user interface.

5. The valve arrangement of claim 1, further comprising a plurality of operating modes, wherein a first operating mode is a programming mode that enables user changes to the plurality of system parameters.

6. The valve arrangement of claim 5, wherein the microcontroller is configured to:
detect a regeneration of the water conditioning system;
determine whether the valve controller is operating in the programming mode; and
exit the programming mode during a duration of the regeneration.

7. The valve arrangement of claim 6, wherein the user interface is configured to display a regeneration step and a corresponding time remaining until regeneration is complete.

8. The valve arrangement of claim 5, wherein the microcontroller is configured to prevent the valve controller from entering the programming mode during regeneration of the water conditioning system.

9. A valve arrangement in a water conditioning system, the valve arrangement comprising:
a valve controlled by a motor; and
a valve controller provided in the form of:
a controller housing;
a user interface on the controller housing, the user interface including a display and one or more buttons designed to receive user inputs; and
a control board supported by the controller housing, the control board including a microcontroller in communication with the display, the one or more buttons, and the motor, the microcontroller designed to execute computer-readable instructions, which, when executed, cause the microcontroller to:
communicate with one or more other valve controllers in the water conditioning system,
control the motor to operate the valve, and
automatically assign the valve controller an address within a network formed by the valve controller and the one or more other valve controllers.

10. The valve arrangement of claim 9, wherein the microcontroller automatically assigns the valve controller the address when the microcontroller powers on.

11. The valve arrangement of claim 9, wherein the microcontroller sends one or more messages that each include the address of the valve controller for which the message is intended.

12. The valve arrangement of claim 9, wherein the microcontroller automatically assigns the valve controller the address within the network by
   a) selecting a number randomly that corresponds to a potential address of the valve controller;
   b) communicating the number to the one or more other valve controllers in the water conditioning system;
   c) determining if the number corresponds to one of the one or more other valve controllers in the water conditioning system;
   d) selecting a different number upon determining that the number corresponds to one of the one or more other valve controllers in the water conditioning system;
   repeating steps a) through d) until a selected number does not correspond to one of the one or more other valve controllers; and
   assigning the selected number as the address of the valve controller within the network.

13. The valve arrangement of claim 12, wherein the step of determining if the number corresponds to one of the one or more other valve controllers in the water conditioning system comprises determining if a notification has been received from one of the one or more other valve controllers in the water conditioning system indicating that the number is already assigned as an address for one of the one or more other valve controllers.

14. A valve arrangement in a water conditioning system, the valve arrangement comprising:
   a valve controlled by a motor; and
   a valve controller provided in the form of:
      a controller housing;
      a user interface on the controller housing, the user interface including a display and one or more buttons designed to receive user inputs; and
      a control board supported by the controller housing, the control board including a microcontroller in communication with the display, the one or more buttons, and the motor, the microcontroller designed to execute computer-readable instructions, which, when executed, cause the microcontroller to:
         communicate with one or more other valve controllers in the water conditioning system,
         control the motor to operate the valve, and
         display an error log to a user via the display, wherein each error in the error log includes an error description and a timestamp.

15. The valve arrangement of claim 14, further comprising:
   a plurality of operating modes;
   wherein a first operating mode of the plurality of operating modes is a service mode, wherein when the valve arrangement is in the service mode, the valve arrangement supplies water to the water conditioning system;
   wherein a second operating mode of the plurality of operating modes is a standby mode, wherein when the valve arrangement is in the standby mode, the valve arrangement does not supply water to the water conditioning system; and
   wherein the microcontroller is further configured to detect one or more error conditions, wherein when the microcontroller detects the one or more error conditions, the microcontroller controls the valve arrangement to:
      remain in the service mode if the valve arrangement is in the service mode; and
      switch to the service mode if the valve arrangement is in the standby mode.

16. The valve arrangement of claim 14, wherein the microcontroller is designed to detect one or more error conditions and causes the display to alternate between a normal screen and an error screen when the microcontroller detects the one or more error conditions.

17. The valve arrangement of claim 14, wherein the microcontroller scrolls through the error log in response to one or more of the one or more buttons on the user interface being actuated.

18. The valve arrangement of claim 14, wherein the computer-readable instructions further cause the microcontroller to transfer the error log to an external computer.

19. The valve arrangement of claim 14, wherein each of the timestamps includes a date and a time corresponding to an occurrence of an error condition.

20. The valve arrangement of claim 14, wherein the error log corresponds to a plurality of devices within the water conditioning system.

* * * * *